United States Patent
Tai et al.

(10) Patent No.: US 9,873,238 B2
(45) Date of Patent: *Jan. 23, 2018

(54) INNER LINER FOR PNEUMATIC TIRE AND METHOD FOR PRODUCING THE SAME

(75) Inventors: Shinji Tai, Okayama (JP); Hiroshi Kawai, Okayama (JP); Satoshi Yamakoshi, Okayama (JP); Kouta Isoyama, Okayama (JP); Masao Hikasa, Okayama (JP); Yuwa Takahashi, Tokyo (JP); Hideki Kitano, Tokyo (JP); Tetsuo Amamoto, Tokyo (JP); Takatsugu Tanaka, Tokyo (JP)

(73) Assignees: KURARAY CO., LTD., Kurashiki-shi (JP); Bridgestone Corporation, Tokyo (JP)

(*) Notice: Subject to any disclaimer, the term of this patent is extended or adjusted under 35 U.S.C. 154(b) by 1046 days.

This patent is subject to a terminal disclaimer.

(21) Appl. No.: 13/513,429

(22) PCT Filed: Nov. 30, 2010

(86) PCT No.: PCT/JP2010/071413
§ 371 (c)(1),
(2), (4) Date: Jun. 1, 2012

(87) PCT Pub. No.: WO2011/068104
PCT Pub. Date: Jun. 9, 2011

(65) Prior Publication Data
US 2012/0237742 A1    Sep. 20, 2012

(30) Foreign Application Priority Data

Dec. 1, 2009  (JP) .................................. 2009-273838
Oct. 1, 2010  (JP) .................................. 2010-224381

(51) Int. Cl.
*B32B 27/08* (2006.01)
*B32B 27/32* (2006.01)
(Continued)

(52) U.S. Cl.
CPC .......... *B32B 27/08* (2013.01); *B29D 30/0681* (2013.01); *B32B 25/08* (2013.01);
(Continued)

(58) Field of Classification Search
CPC ....... Y10T 428/31924; Y10T 428/3192; Y10T 428/31573; Y10T 428/3175;
(Continued)

(56) References Cited

U.S. PATENT DOCUMENTS 3,579,416 A    5/1971  Schrenk
5,089,353 A    2/1992  Negi et al.
(Continued)

FOREIGN PATENT DOCUMENTS

CN    1088077 C      7/2002
CN    101272902 A    9/2008
(Continued)

OTHER PUBLICATIONS

U.S. Appl. No. 13/513,354, filed Jun. 1, 2012, Tai, et al.
(Continued)

*Primary Examiner* — Nancy R Johnson
(74) *Attorney, Agent, or Firm* — Oblon, McClelland, Maier & Neustadt, L.L.P.

(57) ABSTRACT

Disclosed is an inner liner for a pneumatic tire, the inner liner including no less than 8 resin-layers, the resin-layer having a layer A constituted with a resin composition containing a gas barrier resin, and a layer B constituted with a resin composition containing an elastomer, at least one of the resin compositions included in the layer A and the layer B that are adjacent with each other containing a metal salt,
(Continued)

the content of the metal salt being no less than 1 ppm and no greater than 10,000 ppm in terms of metal element equivalent, and an interlayer adhesive force between the layer A and the layer B being no less than 500 g/15 mm. The layer A and the layer B are preferably alternately laminated.

13 Claims, 1 Drawing Sheet

(51) Int. Cl.

| | | |
|---|---|---|
| *B32B 27/34* | (2006.01) | |
| *B32B 27/36* | (2006.01) | |
| *B32B 27/40* | (2006.01) | |
| *B29D 30/06* | (2006.01) | |
| *B32B 25/08* | (2006.01) | |
| *B32B 25/14* | (2006.01) | |
| *B32B 25/16* | (2006.01) | |
| *B32B 27/06* | (2006.01) | |
| *B32B 27/18* | (2006.01) | |
| *B32B 27/28* | (2006.01) | |
| *B32B 27/30* | (2006.01) | |
| *B60C 1/00* | (2006.01) | |
| *B60C 5/14* | (2006.01) | |
| *C09J 109/00* | (2006.01) | |
| *C09J 109/06* | (2006.01) | |
| *C09J 121/00* | (2006.01) | |

(52) U.S. Cl.
CPC .............. *B32B 25/14* (2013.01); *B32B 25/16* (2013.01); *B32B 27/06* (2013.01); *B32B 27/18* (2013.01); *B32B 27/28* (2013.01); *B32B 27/30* (2013.01); *B32B 27/32* (2013.01); *B32B 27/34* (2013.01); *B32B 27/36* (2013.01); *B32B 27/40* (2013.01); *B60C 1/0008* (2013.01); *B60C 5/14* (2013.01); *C09J 109/00* (2013.01); *C09J 109/06* (2013.01); *C09J 121/00* (2013.01); *B29D 2030/0682* (2013.01); *B60C 2005/145* (2013.01); *Y10T 428/24942* (2015.01); *Y10T 428/269* (2015.01); *Y10T 428/3154* (2015.01); *Y10T 428/3175* (2015.04); *Y10T 428/3192* (2015.04); *Y10T 428/31573* (2015.04); *Y10T 428/31797* (2015.04); *Y10T 428/31913* (2015.04); *Y10T 428/31924* (2015.04)

(58) Field of Classification Search
CPC ..... Y10T 428/31913; Y10T 428/31797; Y10T 428/3154; B29D 30/0681; B60C 1/0008; B60C 5/14; B60C 2005/145; B32B 25/04; B32B 25/08; B32B 27/06; B32B 27/08; B32B 27/18; B32B 27/30; B32B 27/32; B32B 27/34; B32B 27/36; B32B 27/40
See application file for complete search history.

(56) References Cited

U.S. PATENT DOCUMENTS

| | | | |
|---|---|---|---|
| 5,178,702 A * | 1/1993 | Frerking et al. | .............. 152/510 |
| 5,300,354 A | 4/1994 | Harita et al. | |
| 5,346,950 A | 9/1994 | Negi et al. | |
| 5,433,908 A | 7/1995 | Harita et al. | |
| 6,174,949 B1 * | 1/2001 | Ninomiya et al. | ............ 524/404 |
| 6,579,601 B2 | 6/2003 | Kollaja et al. | |
| 6,582,786 B1 | 6/2003 | Bonk et al. | |
| 7,033,458 B2 | 4/2006 | Chang et al. | |
| 7,229,518 B1 | 6/2007 | Watkins | |
| 7,600,546 B2 | 10/2009 | Fujino et al. | |
| 2003/0207061 A1 | 11/2003 | Hayashi et al. | |
| 2004/0096683 A1 | 5/2004 | Ikeda et al. | |
| 2008/0003390 A1 | 1/2008 | Hayashi et al. | |
| 2009/0308517 A1 | 12/2009 | Nohara et al. | |
| 2009/0311524 A1 | 12/2009 | Noma et al. | |
| 2010/0147431 A1 | 6/2010 | Morooka | |
| 2010/0147432 A1 | 6/2010 | Morooka | |
| 2011/0024015 A1 | 2/2011 | Takahashi et al. | |

FOREIGN PATENT DOCUMENTS

| | | |
|---|---|---|
| CN | 101516646 A | 8/2009 |
| EP | 0 186 154 A2 | 7/1986 |
| EP | 0 322 364 A1 | 6/1989 |
| EP | 0 504 808 A1 | 9/1992 |
| EP | 2 014 462 A1 | 1/2009 |
| EP | 2 045 102 A1 | 4/2009 |
| JP | 6 40207 | 2/1994 |
| JP | 2000-318079 A | 11/2000 |
| JP | 2002 524317 | 8/2002 |
| JP | 2003 512201 | 4/2003 |
| JP | 2003 231715 | 8/2003 |
| JP | 2006 188710 | 7/2006 |
| JP | 2006 233222 | 9/2006 |
| JP | 2006-233222 | 9/2006 |
| JP | 2006 272569 | 10/2006 |
| JP | 2008-213840 | 9/2008 |
| JP | 2008 247030 | 10/2008 |
| JP | 2009-220793 | 10/2009 |
| JP | 2009-242644 | 10/2009 |
| RU | 2 133 702 C1 | 7/1999 |
| WO | 2007 037541 | 4/2007 |
| WO | 2007 083785 | 7/2007 |
| WO | WO 2007/129371 A1 | 11/2007 |
| WO | WO 2009/123229 A1 | 10/2009 |

OTHER PUBLICATIONS

Office Action dated Jul. 14, 2014 in co-pending U.S. Appl. No. 13/513,354.
Office Action dated Mar. 26, 2015 in co-pending U.S. Appl. No. 13/513,354.
Decision to Grant dated Mar. 5, 2015 in Russian Patent Application No. 2012127324 (with English language translation).
Extended European Search Report dated Apr. 17, 2013 in Patent Application No. 10834554.7.
Extended European Search Report dated Apr. 23, 2013 in Patent Application No. 10834555.4.
International Search Report dated Dec. 28, 2010 in PCT/JP10/71413 Filed Nov. 30, 2010.

* cited by examiner

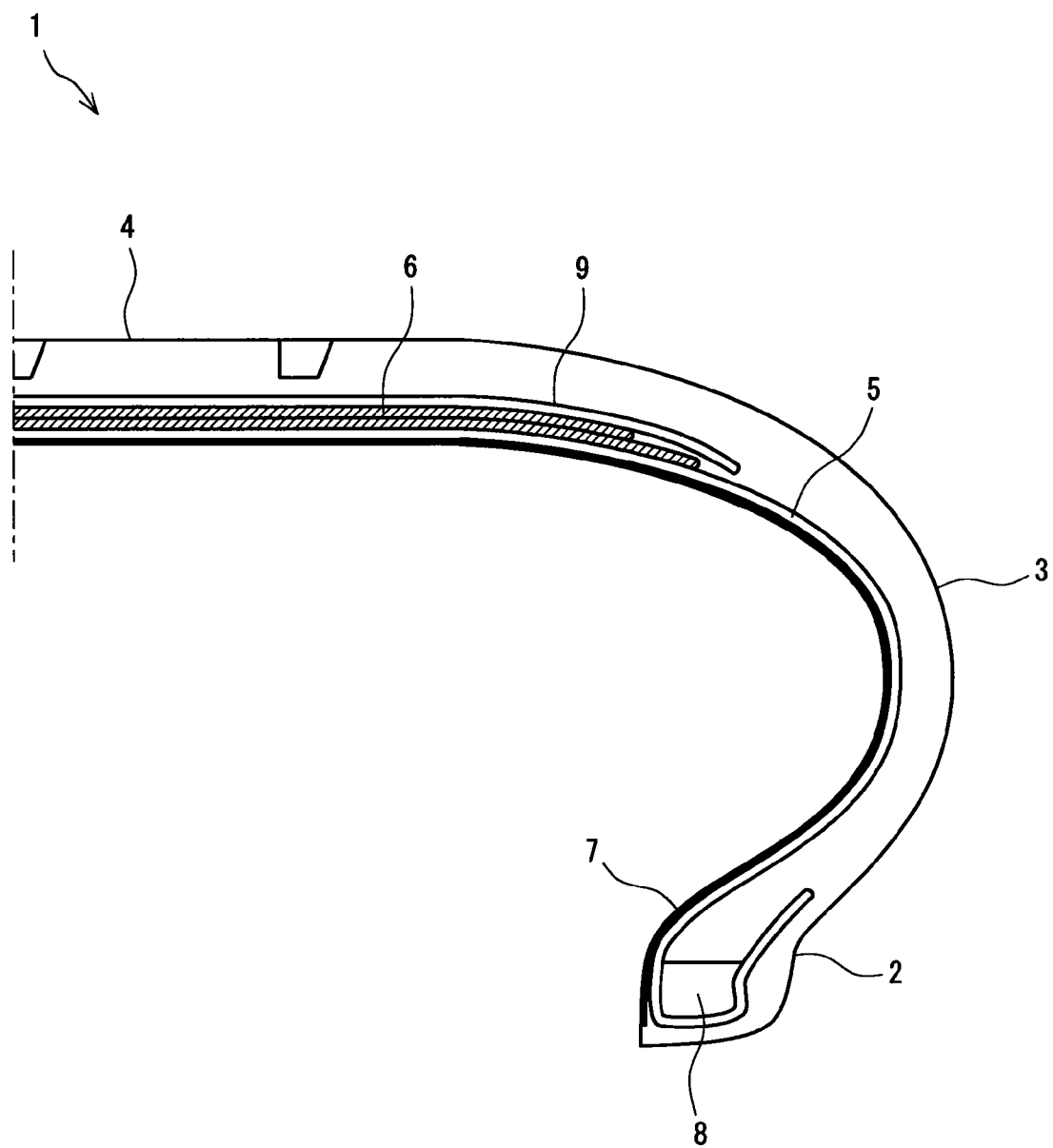

INNER LINER FOR PNEUMATIC TIRE AND METHOD FOR PRODUCING THE SAME

THE NAMES OF THE PARTIES TO A JOINT RESEARCH AGREEMENT

The present invention was made under a Joint Research Agreement between Kuraray Co., Ltd. and Bridgestone Corporation. The Joint Research Agreement was in effect on or before the date the present invention was made, and the present invention was made as a result of the activities undertaken within the scope of the Joint Research Agreement.

TECHNICAL FIELD

The present invention relates to an inner liner for a pneumatic tire, the inner liner having no less than 8 resin-layers, and a method for producing the same.

BACKGROUND ART

Nowadays, laminated films having an ethylene-vinyl alcohol copolymer layer have been used in applications such as packaging materials for food, medical applications and the like, taking advantages of their superior gas barrier properties, stretchability, thermoformability and the like. Recently, for the purpose of improving various types of performances such as gas barrier properties, various multi-layered structures have been proposed in which a plurality of resin-layers are laminated, each layer having a thickness of micron or submicron order.

Conventional multilayered structures developed so far in which a plurality of resin-layers of an ethylene-vinyl alcohol copolymer are laminated include, for example: (1) an elastomeric barrier film in which at least ten layers of a micro-layer polymer composite formed from a fluid barrier material such as an ethylene-vinyl alcohol copolymer, and an elastomer material such as thermoplastic polyurethane are alternately laminated (see Japanese Unexamined Patent Application (Translation of PCT Application), Publication No. 2002-524317); (2) multilayer film alternately including layers of a hard polymer material such as an ethylene-vinyl alcohol copolymer and flexible polymer material (see Japanese Unexamined Patent Application (Translation of PCT Application), Publication No. 2003-512201), and the like.

However, according to the aforementioned conventional multilayered structure (1), adhesiveness between a fluid barrier material such as an ethylene-vinyl alcohol copolymer and an elastomer material such as thermoplastic polyurethane is not in any way considered. In addition, also according to the aforementioned conventional multilayered structure (2), the hard polymer material per se such as an ethylene-vinyl alcohol copolymer, and combination of the same with the flexible polymer material, and the like are not investigated in connection with the interlayer adhesiveness, but only a technique of strengthening the adhesiveness between each layer using a joining layer merely consisting of a hot melt adhesive is disclosed. Therefore, according to these conventional multilayered structure (1) and multilayered structure (2), the interlayer adhesiveness is insufficient, and due to delamination between layers and the like, cracks are likely to be generated on the barrier layer, whereby durability may be deteriorated. As a result, gas barrier properties may be insufficient according to the conventional multilayered structure (1).

On the other hand, a rubber composition containing a butyl rubber, a halogenated butyl rubber or the like as a principal material has been conventionally used for an inner liner provided as an air barrier layer on the inner face of a tire in order to retain an internal pressure of the tire. However, the thickness of the inner liner should be about 1 mm when such a rubber composition is used for an inner liner since the rubber composition containing such a butyl based rubber as a principal material has poor air barrier properties. As a result, the weight of the inner liner reaches approximately 5% of the total weight of the tire, thereby hampering improvement of the fuel efficiency of automobiles, agricultural vehicles, construction vehicles and the like by decreasing the weight of tires.

Accordingly, a technique in which an ethylene-vinyl alcohol copolymer that is superior in gas barrier properties and the like is used for producing an inner liner as described above has been also developed (see, for example, Japanese Unexamined Patent Application, Publication No. H6-40207, and the like). However, when an ethylene-vinyl alcohol copolymer is used as an inner liner, a modulus of elasticity higher than those of butyl rubbers, etc., which have been conventionally used for tires, leads to disadvantages such as fracturing and generation of cracks due to flexion of the tire during running, although significant effects of improving internal pressure retainability of tires can be achieved owing to superior gas barrier properties.

In view of these disadvantages, use of a multilayered structure that includes layers containing an ethylene-vinyl alcohol copolymer as an inner liner may be conceived. However, in order to use the multilayered structure as an inner liner for a pneumatic tire, it is necessary to improve the interlayer adhesiveness and the like described above so as to further enhance the durability such that the tire can endure the environment in use.

PRIOR ART DOCUMENTS

Patent Documents

Patent Document 1: Japanese Unexamined Patent Application (Translation of PCT Application), Publication No. 2002-524317

Patent Document 2: Japanese Unexamined Patent Application (Translation of PCT Application), Publication No. 2003-512201

Patent Document 3: Japanese Unexamined Patent Application, Publication No. H6-40207

SUMMARY OF THE INVENTION

Problems to be Solved by the Invention

The present invention was made in view of these circumstances, and an object of the invention is to provide an inner liner for a pneumatic tire that is excellent in interlayer adhesiveness, has superior gas barrier properties, stretchability, thermoformability and the like, and is capable of maintaining characteristics such as gas barrier properties even when used with deformation such as stretching or flexion imposed due to excellent durability such as being less likely to be accompanied by crack formation. Additionally, other object of the invention is to provide a method for producing an inner liner having such characteristics, while suppressing an increase in production costs.

Means for Solving the Problems

An aspect of the invention made for solving the foregoing problems is an inner liner for a pneumatic tire, the inner liner including no less than 8 resin-layers, the resin-layer having a layer A constituted with a resin composition containing a gas barrier resin, and a layer B constituted with a resin composition containing an elastomer, at least one of the resin compositions included in the layer A and the layer B that are adjacent with each other containing a metal salt, the content of the metal salt being no less than 1 ppm and no greater than 10,000 ppm in terms of metal element equivalent, and an interlayer adhesive force between the layer A and the layer B being no less than 500 g/15 mm.

The inner liner has superior gas barrier properties, stretchability and thermoformability due to including no less than 8 resin-layers. In addition, due to: including a layer A containing a gas barrier resin, and a layer B containing an elastomer; at least one of the resin compositions included in the layer A and the layer B that are adjacent with each other containing a metal salt; and the interlayer adhesive force between the layer A and the layer B being no less than 500 g/15 mm, the inner liner has very superior interlayer adhesiveness. Therefore, due to the very superior interlayer adhesiveness, the inner liner maintains characteristics such as superior gas barrier properties even against deformation such as stretching or flexion, and has very high durability.

The layer A and the layer B are preferably alternately laminated. By thus alternately laminating the layer A and the layer B, each interlayer formed by lamination can achieve the aforementioned superior adhesiveness. As a result, interlayer adhesiveness of the inner liner, in turn, gas barrier properties, durability, and the like can be significantly improved.

The average thickness of single layer of at least one selected from the layer A and the layer B is preferably no less than 0.01 μm and no greater than 10 μm. When the average thickness of the layer A and/or layer B falls within the above range, the number of layers can be increased even if the entirety of the inner liner has an identical thickness, and consequently, the gas barrier properties, durability and the like of the inner liner can be further improved.

The inner liner has a thickness of preferably no less than 0.1 μm and no greater than 1,000 μm. When the inner liner has a thickness falling within the above range, along with the effects achievable by the average thickness of the layer A and/or layer B falling within the range as described above, gas barrier properties, durability, stretchability and the like can be further improved while maintaining applicability to the pneumatic tire.

The elastomer is preferably at least one selected from the group consisting of a polystyrene based elastomer, a polyolefin based elastomer, a polydiene based elastomer, a polyvinyl chloride based elastomer, a chlorinated polyethylene based elastomer, a polyurethane based elastomer, a polyester based elastomer, a polyamide based elastomer and a fluorine contained resin based elastomer. When any one of the above polymers is used as the elastomer, the stretchability of the inner liner can be effectively increased, whereby further improvement of the flex resistance is enabled.

As the metal salt, at least one selected from the group consisting of alkali metal salts, alkaline earth metal salts and d-block metal salts in group 4 of periodic table are preferably used. When such a metal salt is used, the interlayer adhesiveness between the layer A and the layer B can be effectively achieved, and as a result, the gas barrier properties, durability and the like of the inner liner can be further improved.

The gas barrier resin is preferably an ethylene-vinyl alcohol copolymer. Use of the ethylene-vinyl alcohol copolymer as a gas barrier resin enables the gas barrier properties of the inner liner to be further improved.

The content of ethylene units of the ethylene-vinyl alcohol copolymer is preferably no less than 3 mol % and no greater than 70 mol %. When the content of ethylene units falls within the above range, the gas barrier properties of the inner liner is improved, and additionally melt formability can be improved, whereby improvement of the interlayer adhesiveness is enabled owing to the superior melt formability.

The ethylene-vinyl alcohol copolymer preferably has a saponification degree of no less than 80 mol %. When the saponification degree falls within the above range, the gas barrier properties of the inner liner can be further improved, and the moisture resistance can be also improved. In addition, the saponification degree falling within the above range serves in enabling the interlayer adhesiveness with the layer B to be improved.

It is desired that the ethylene-vinyl alcohol copolymer includes at least one selected from the group consisting of the following structural units (I) and (II), and the content of the structural units (I) or (II) with respect to the entire structural units is no less than 0.5 mol % and no greater than 30 mol %.

When the ethylene-vinyl alcohol copolymer of the layer A thus includes the following structural unit (I) and/or (II) at a content within the aforementioned range, flexibility and processing characteristics of the resin composition constituting the layer A are improved, and thus the interlayer adhesiveness, stretchability and thermoformability of the inner liner can be improved.

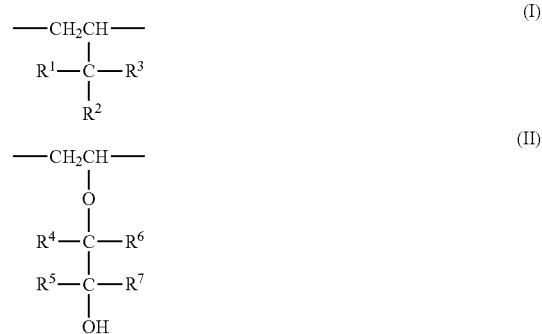

In the above formula (I), $R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; two among $R^1$, $R^2$ and $R^3$ may bind with one another, unless the two among $R^1$, $R^2$ and $R^3$ both represent a hydrogen atom; and the aliphatic hydrocarbon group having 1 to 10 carbon atoms, the alicyclic hydrocarbon group having 3 to 10 carbon atoms and the aromatic hydrocarbon group having 6 to 10 carbon atoms may have a hydroxyl group, a carboxyl group or a halogen atom; and In the above formula (II), $R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; $R^4$ and $R^5$ or $R^6$ and $R^7$ may bind with one another, unless both $R^4$ and $R^5$ or both $R^6$ and $R^7$ represent a hydrogen atom; the aliphatic hydrocarbon group having 1 to 10 carbon atoms, the alicyclic hydrocarbon group having 3 to 10 carbon atoms and the aromatic hydrocarbon group having 6 to 10 carbon atoms may have a hydroxyl group, an alkoxy group, a carboxyl group or a halogen atom.

The resin composition of the layer A may contain a phosphate compound in an amount of no less than 1 ppm and no greater than 10,000 ppm in terms of phosphoric acid group equivalent, a carboxylic acid in an amount of no less than 1 ppm and no greater than 10,000 ppm, or a boron compound in an amount of no less than 1 ppm and no greater than 2,000 ppm in terms of boron equivalent. By thus containing a phosphate compound, a carboxylic acid or a boron compound in the resin composition of the layer A, thermal stability of the inner liner in melt forming can be improved, and consequently, the interlayer adhesiveness of the inner liner can be improved.

It is desired that the resin composition that constitutes the layer A and/or layer B has a melt viscosity ($\eta_1$) as determined at a temperature of 210° C. and a shear rate of 10/sec being no less than $1\times10^2$ Pa·s and no greater than $1\times10^4$ Pa·s and a melt viscosity ($\eta_2$) as determined at a temperature of 210° C. and a shear rate of 1,000/sec being no less than $1\times10^1$ Pa·s and no greater than $1\times10^3$ Pa·s, and a ratio ($\eta_2/\eta_1$) of the melt viscosity satisfies the following formula (1). When the resin composition of the layer A and/or layer B thus has a melt viscosity and a ratio of the melt viscosity falling within the above range, the layer A and the layer B, in turn, the inner liner can be formed with a size as intended and at a high speed, and an effect of improving the interlayer adhesiveness is also exhibited.

$$-0.8 \leq (1/2)\log_{10}(\eta_2/\eta_1) \leq -0.1 \qquad (1)$$

A ratio ($\eta_{2B}/\eta_{2A}$) of a melt viscosity ($\eta_{2B}$) of the resin composition of the layer B to a melt viscosity ($\eta_{2A}$) of the resin composition of the layer A as determined at a temperature of 210° C. and a shear rate of 1,000/sec is preferably 0.3 or greater and 2 or less. When the ratio ($\eta_{2B}/\eta_{2A}$) of the melt viscosity falls within the above range, an adhesive force between the layer A and the layer B in an inner liner obtained by melt forming can be further enhanced, and durability of the inner liner can be improved.

In the inner liner, it is preferred that a binding reaction occurs at an interface between the layer A and the layer B. Accordingly, by linking via a covalent bond or ionic bond between molecules of the resin compositions that constitute the layer A and the layer B, more superior interlayer adhesiveness can be attained. As a result, the gas barrier properties, durability and the like of the inner liner can be further improved.

Additionally, other aspect of the present invention made for solving the foregoing problems provides a method for producing an inner liner for a pneumatic tire, the method including forming by a multilayer coextrusion process using a resin composition containing a gas barrier resin, and a resin composition containing an elastomer. According to the method for producing an inner liner, an inner liner that is excellent in interlayer adhesiveness, and has superior gas barrier properties, stretchability and durability can be produced easily and certainly while suppressing an increase in production costs.

Effects of the Invention

As explained in the foregoing, since the inner liner of the present invention is excellent in interlayer adhesiveness, it has not only superior gas barrier properties, as well as stretchability and thermoformability in combination, but also superior durability so that characteristics such as superior gas barrier properties can be maintained even in the case in which it is used with deformation such as stretching or flexion imposed in use for a pneumatic tire. In addition, according to the method for producing an inner liner of the present invention, an inner liner having such characteristics can be produced easily and certainly while suppressing an increase in production costs.

BRIEF DESCRIPTION OF THE DRAWING

FIG. 1 shows a schematic partial cross-sectional view illustrating a pneumatic tire having an inner liner for a pneumatic tire according to one embodiment of the present invention.

DESCRIPTION OF EMBODIMENTS

Hereinafter, embodiments of the inner liner for a pneumatic tire and the method for producing the same of the present invention are described in detail.

The inner liner for a pneumatic tire of the present invention is a multilayered structure having no less than 8 resin-layers. The resin-layer includes a layer A constituted with a resin composition containing a gas barrier resin, and a layer B constituted with a resin composition containing an elastomer. In the layer A and layer B, at least one of the resin compositions included in the layer A and the layer B that are adjacent with each other contains a metal salt.

Hereinafter, a layered structure, the layer A, the layer B, the metal salt, relationship between the layer A and the layer B, a production method and applications of the multilayered structure are explained in this order.

<Layered Structure of the Multilayered Structure>

The inner liner is a multilayered structure having no less than 8 resin-layers as described above. Due to the configuration in which no less than 8 resin-layers are laminated, continuous development of defects such as pinhole and breakage can be prevented, and as a result, the inner liner has superior characteristics such as gas barrier properties and durability resulting from the structure per se. In these regards, and in light of the production, total number of the resin-layers is preferably no less than 10, more preferably no less than 15, and particularly preferably no less than 18.

The resin-layer includes at least two types of layers, the layer A and the layer B, and other C layer and the like may be further included. By laminating at least 8 layers in total of two or more types of the layers including the layer A constituted with a resin composition containing a gas barrier resin and the layer B constituted with a resin composition containing an elastomer, a multilayered structure having superior gas barrier properties resulting from the layer A, and stretchability and thermoformability resulting from the layer B in combination can be provided. In addition, the inner liner can maintain gas barrier properties even if used with repeated deformation such as stretching or flexion imposed, owing to the laminated configuration of the layer A and the layer B.

It is to be noted that the layer A may be constituted with either a single resin composition, or a plurality of types of resin compositions as long as a gas barrier resin is included. The layer B may be also constituted with either a single resin composition, or a plurality of types of resin compositions including an elastomer, similarly to the layer A.

The order of lamination of the layer A and the layer B is not particularly limited as long as a structure having at least a site including the layer A and the layer B being adjacent with each other is formed. For example, the order of lamination such as:

(1) A, B, A, B . . . A, B (i.e., $(AB)_n$);
(2) A, B, A, B . . . A (i.e., $(AB)_nA$);
(3) B, A, B, A . . . B (i.e., $(BA)_nB$); and
(4) A, A, B, B . . . B, B (i.e., $(AABB)_n$)

may be employed. In addition, when the other C layer is included, for example, the order of lamination such as (5) A, B, C . . . A, B, C (i.e., $(ABC)_n$)

may be employed.

In particular, according to preferable orders of lamination of the layer A and layer B, the layer A and the layer B are alternately laminated as in the above (1), (2) or (3). Thus alternately laminated structure makes the inner liner have superior gas barrier properties and flexibility. Furthermore, strong adhesive force between the layer A and the layer B described later can be affected at the entirety of the interlayer, whereby defects such as interlayer delamination can be significantly reduced. As a result, the effects of the invention, i.e., improvement of characteristics of the inner liner such as gas barrier properties and durability of the characteristics can be more efficiently achieved.

The lower limit of the thickness of the inner liner is preferably 0.1 μm, more preferably 1 μm, and still more preferably 5 μm. On the other hand, the upper limit of the thickness of the inner liner is preferably 1,000 μm, more preferably 700 μm, and still more preferably 500 μm. When the thickness of the inner liner is less than the lower limit described above, the strength becomes insufficient, whereby use of the multilayered structure may be difficult. To the contrary, when the thickness of the inner liner is beyond the upper limit described above, flexibility, formability and the like deteriorate, whereby an increase in production costs may be brought. In addition, when the thickness of the inner liner is beyond the upper limit described above, as a result of an increase in the mass, fuel efficiency of automobiles and the like to which the tire is applied may be deteriorated. Note that the thickness of the inner liner (multilayered structure) may be determined by measuring the thickness of the cross section at arbitrarily selected points of the multilayered structure.

The lower limit of the average thickness of the layer A in terms of a single layer is preferably 0.01 μm, more preferably 0.05 μm, and still more preferably 0.1 μm. On the other hand, the upper limit of the average thickness of the layer A in terms of a single layer is preferably 10 μm, more preferably 7 μm, still more preferably 5 μm, and particularly preferably 2 μm. When the average thickness of the layer A in terms of a single layer is less than the lower limit described above, formation with a uniform thickness becomes difficult, whereby the gas barrier properties and their durability of the inner liner may deteriorate. To the contrary, when the average thickness of the layer A in terms of a single layer is beyond the upper limit described above, it becomes difficult to increase the number of layers if the entirety of the inner liner has an identical average thickness, whereby the effect of improving gas barrier properties due to the multilayer as described above may not be effected, and stretchability and thermoformability of the inner liner may be deteriorated. It is to be noted that the average thickness of the layer A in terms of a single layer refers to a value derived by dividing the total thickness of all layers A included in the inner liner by the number of the layers A.

For a similar reason, the lower limit of the average thickness of the layer B in terms of a single layer is preferably 0.01 μm, more preferably 0.05 μm, and still more preferably 0.1 μm. On the other hand, the upper limit of the average thickness of the layer B in terms of a single layer is preferably 10 μm, more preferably 7 μm, still more preferably 5 μm, and particularly preferably 2 μm. It is to be noted that the average thickness of the layer B in terms of a single layer also refers to a value derived by dividing the total thickness of all layers B included in the inner liner by the number of the layers B.

<Layer A>

The layer A is constituted with a resin composition containing a gas barrier resin. Since the resin composition constituting the layer A contains a gas barrier resin, inner liner that is superior in gas barrier properties can be obtained.

The gas barrier resin has a function of preventing permeabilization of gas, specifically has an oxygen transmission rate as determined according to a method described in JIS-K7126 (isopiestic method) under conditions including 20° C. and 65% RH of no greater than 100 mL·20 μm/(m²·day·atm). It should be noted that the oxygen transmission rate of the gas barrier resin used in the present invention is preferably no greater than 50 mL·20 μm/(m² day·atm), and more preferably no greater than 10 mL·20 μm/(m² day·atm).

Such a gas barrier resin is exemplified by an ethylene-vinyl alcohol copolymer (hereinafter, may be also referred to as "EVOH".), a polyamide resin, a polyester resin, polyvinylidene chloride, an acrylonitrile copolymer, polyvinylidene fluoride, polychlorotrifluoroethylene, polyvinyl alcohol, and the like.

Of these resins having gas barrier properties, EVOH, polyamide resins and polyester resins are preferred in light of the gas barrier properties, and EVOH is particularly preferred in light of not only gas barrier properties but also melt formability, adhesiveness with the layer B, and the like.

<Polyamide Resin>

The polyamide resin is a polymer having an amide bond, and can be obtained by ring-opening polymerization of lactam, polycondensation of aminocarboxylic acid or diamine with dicarboxylic acid, or the like.

Examples of the lactam include ε-caprolactam, ω-laurolactam, and the like.

Examples of the aminocarboxylic acid include 6-aminocaproic acid, 11-aminoundecanoic acid, 12-aminododecanoic acid, paraaminomethylbenzoic acid, and the like.

Examples of the diamine include tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonamethylenediamine, m-xylylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, and the like.

The dicarboxylic acid is exemplified by succinic acid, glutaric acid, adipic acid, pimelic acid, suberic acid, azelaic acid, sebacic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid, 3,9-bis(2-carboxyethyl)-2,4,8,10-tetraoxaspiro[5.5]undecane, trimellitic acid, trimesic acid, pyromellitic acid, tricarballylic acid, terephthalic acid, isophthalic acid, phthalic acid, 2-methylterephthalic acid, naphthalenedicarboxylic acid, biphenyldicarboxylic acid, tetraphosphorusdicarboxylic acid, and the like.

Exemplary method for the polycondensation which may be employed in synthesizing the polyamide resin includes a method in which polycondensation is allowed in a molten state, and a method in which polycondensation is once allowed in a molten state to obtain low viscosity polyamide, followed by subjecting to a heat treatment in a solid phase state (solid phase polymerization, generally referred to). Exemplary method for the polycondensation in a molten state which may be employed includes a method in which an aqueous solution of a nylon salt of diamine and dicarboxylic acid is heated under pressure, and then polycondensation is allowed in a molten state while eliminating water and condensed water, a method in which diamine is directly added to dicarboxylic acid in a molten state, and then polycondensation is allowed under normal pressure, and the like.

Examples of specific polyamide resin that is a polycondensate of the compound or the like include aliphatic polyamide resins such as polycaprolactam (nylon 6), polylaurolactam (nylon 12), polyhexamethylenediadipamide (nylon 66), polyhexamethyleneazelamide (nylon 69), polyhexamethylenesebacamide (nylon 610), nylon 46, nylon 6/66, nylon 6/12, and a condensation product of 11-aminoundecanoic acid (nylon 11), aromatic polyamide resins such as polyhexamethyleneisophthalamide (nylon 6IP), m-xylenediamine/adipic acid copolymer (nylon MXD6), and m-xylenediamine/adipic acid/isophthalic acid copolymer, and the like. These may be used alone or as a mixture of two or more thereof.

Among these polyamide resins, nylon MXD6 having superior gas barrier properties is preferred. With respect to a diamine component of the nylon MXD6, m-xylylenediamine is preferably included in an amount of no less than 70 mol %. Whereas, with respect to a dicarboxylic acid component, adipic acid is preferably included in an amount of no less than 70 mol %. When nylon MXD6 is obtained from the monomer blended as described above, more superior gas barrier properties and mechanical performances can be achieved.

<Polyester Resin>

The polyester resin is a polymer having an ester bond, and can be obtained by polycondensation of polyvalent carboxylic acid with polyol, and the like. Examples of the polyester resin which may be used as a resin having gas barrier properties of the multilayered structure include polyethylene terephthalate (PET), polyethylene naphthalate (PEN), polyglycolic acid (PGA), aromatic liquid crystal polyesters, and the like. These may be used alone or as a mixture of two or more thereof. Among these polyester resins, PGA and wholly aromatic liquid crystal polyesters are preferred in light of the extent of gas barrier properties.

<PGA>

PGA is a homopolymer or copolymer having a structural unit represented by —O—CH$_2$—CO— (GA). The content of the aforementioned structural unit (GA) in PGA is preferably no less than 60% by mass, more preferably no less than 70% by mass, and still more preferably no less than 80% by mass. Also, the upper limit of the content is preferably 100% by mass. When the content of the structural unit (GA) is less than the lower limit described above, gas barrier properties may not be sufficiently achieved.

Exemplary method for producing PGA includes (1) a method of synthesis by way of dehydrative polycondensation of glycolic acid, (2) a method of synthesis by way of dealcoholizing polycondensation of a glycolic acid alkyl ester, (3) a method of synthesis by way of ring-opening polymerization of glycolide (1,4-dioxane-2,5-dione), and the like.

Exemplary method for synthesizing PGA as a copolymer may include methods in which copolymerization is carried out in each synthesis method described above using as a comonomer, for example, a cyclic monomer such as ethylene oxalate (1,4-dioxane-2,3-dione), lactide, lactones (for example, β-propiolactone, β-butyrolactone, pivalolactone, γ-butyrolactone, δ-valerolactone, β-methyl-δ-valerolactone, ε-caprolactone, etc.), trimethylene carbonate or 1,3-dioxane;

hydroxycarboxylic acid such as lactic acid, 3-hydroxypropanoic acid, 3-hydroxybutanoic acid, 4-hydroxybutanoic acid or 6-hydroxycaproic acid, or an alkyl ester thereof;

a mixture of aliphatic diol such as ethylene glycol or 1,4-butanediol with substantially equimolar aliphatic dicarboxylic acid such as succinic acid or adipic acid or an alkyl ester thereof; or the like, in appropriate combination with glycolide, glycolic acid or a glycolic acid alkyl ester.

In a specific method of the ring-opening polymerization described above in section (3), glycolide is heated to a temperature of about 120° C. to about 250° C. in the presence of a small amount of a catalyst (for example, a cationic catalyst such as organic tin carboxylate, tin halide or antimony halide). The ring-opening polymerization is carried out preferably by a block polymerization process or solution polymerization process.

In the ring-opening polymerization, glycolide used as a monomer may be obtained by a sublimation depolymerization process, solution-phase depolymerization process, or the like of a glycolic acid oligomer.

A typical solution-phase depolymerization process includes, for example (1) heating a mixture containing a glycolic acid oligomer and at least one high-boiling point polar organic solvent having a boiling point within the range of 230 to 450° C., under an normal pressure or a reduced pressure at a temperature at which depolymerization of the oligomer occurs, (2) dissolving the oligomer in a solvent until a residual ratio (volume ratio) of the melt phase of the oligomer becomes no greater than 0.5, (3) allowing the oligomer to be depolymerized by further heating at the same temperature, (4) distilled off the produced dimer cyclic ester (glycolide) together with the high-boiling point polar organic solvent, and (5) recovering the glycolide from the distillate.

Examples of the high-boiling point polar organic solvent include phthalic acid bis(alkoxyalkyl ester) such as di(2-methoxyethyl)phthalate, alkylene glycol dibenzoate such as diethylene glycol dibenzoate, aromatic carboxylate esters such as benzylbutyl phthalate and dibutyl phthalate, aromatic phosphoric acid esters such as tricresyl phosphate, and the like. Also, together with the high-boiling point polar organic solvent, polypropylene glycol, polyethylene glycol, tetraethylene glycol or the like may be used in combination as a solubilizing agent of the oligomer if necessary.

<Wholly Aromatic Liquid Crystal Polyester>

The wholly aromatic liquid crystal polyester is a liquid crystalline polyester in which polyvalent carboxylic acid and polyol provided as monomers are both an aromatic compound. The wholly aromatic liquid crystal polyester may be obtained by polymerization according to a well-known method similar to general polyesters.

The aromatic polyvalent carboxylic acid is exemplified by terephthalic acid, isophthalic acid, 2,6-naphthalenedicarboxylic acid, 2,7-naphthalenedicarboxylic acid, 1,4-naphthalenedicarboxylic acid, 4,4'-biphenyldicarboxylic acid, 3,3'-biphenyldicarboxylic acid, 4,4'-methylene dibenzoic acid, diphenic acid and the like. These may be used alone or as a mixture of two or more thereof.

The aromatic polyol is exemplified by hydroquinone, methylhydroquinone, 4,4'-dihydroxydiphenyl, resorcinol, phenylhydroquinone, 3,4'-bisphenol A, and the like. These may be used alone or as a mixture of two or more thereof.

Moreover, the wholly aromatic liquid crystal polyester may be obtained also by polymerization of an aromatic compound that has a hydroxy group and a carboxyl group such as hydroxybenzoic acid or hydroxynaphthoic acid, etc., or copolymerization with the aromatic polyvalent carboxylic acid and aromatic polyol.

<EVOH>

Hereinafter, EVOH suitably used as a gas barrier resin of the inner liner of the present invention is explained in detail.

EVOH included in the resin composition of the layer A has an ethylene unit and a vinyl alcohol unit as principal structural units. It is to be noted that EVOH may include one type or a plurality of types of other structural unit in addition to the ethylene unit and the vinyl alcohol unit.

EVOH is usually obtained by polymerizing ethylene with vinyl ester, and saponifying the resultant ethylene-vinyl ester copolymer.

The lower limit of the content of ethylene units in EVOH (i.e., the proportion of the number of ethylene units relative to the total number of monomer units in EVOH) is preferably 3 mol %, more preferably 10 mol %, still more preferably 20 mol %, and particularly preferably 25 mol %. On the other hand, the upper limit of the content of ethylene units in EVOH is preferably 70 mol %, more preferably 60 mol %, still more preferably 55 mol %, and particularly preferably 50 mol %. When the content of ethylene units in EVOH is less than the lower limit described above, gas barrier properties under highly humid conditions and the like of the inner liner may be deteriorated, or melt formability of the inner liner may be impaired. To the contrary, when the content of ethylene units in EVOH is beyond the upper limit described above, the gas barrier properties of the inner liner may be deteriorated.

The lower limit of the saponification degree of EVOH (i.e., the proportion of the number of vinyl alcohol units relative to the total number of vinyl alcohol units and vinyl ester units in EVOH) is preferably 80 mol %, more preferably 95 mol %, and particularly preferably 99 mol %. On the other hand, the upper limit of the saponification degree of EVOH is preferably 99.99 mol %. When the saponification degree of EVOH is less than the lower limit described above, melt formability may be impaired, and additionally the gas barrier properties of the inner liner may be deteriorated, or the coloring resistance and/or moisture resistance may be unsatisfactory. To the contrary, when the saponification degree of EVOH is beyond the upper limit described above, improvement of the gas barrier properties and the like with respect to an increase in production costs of EVOH can be expected to an unsatisfactory extent. Such EVOH may be used alone; however, an embodiment in which such EVOH is used as a blend with EVOH having a saponification degree exceeding 99 mol % is also suitable.

It is preferred that the content G (mol %) of the 1,2-glycol bond structural units in EVOH satisfies the following formula (2), and the intrinsic viscosity be no less than 0.05 L/g and no greater than 0.2 L/g. In the following formula (2), E represents the content of ethylene units (mol %) in EVOH (wherein, $E \leq 64$ (mol %)).

$$G \leq 1.58 - 0.0244 \times E \quad (2)$$

When the resin composition of the layer A includes EVOH having such a content G of 1,2-glycol bond structural units and an intrinsic viscosity, a feature of decreasing humidity dependency of gas barrier properties of the resulting inner liner can be exhibited, and favorable transparency and gloss are provided, while lamination with other thermoplastic resin can be facilitated. It is to be noted that the content G of the 1,2-glycol bond structural units may be determined in accordance with the method described by S. Aniya et al., (Analytical Science Vol. 1, 91 (1985)), by way of a nuclear magnetic resonance process at a temperature of 90° C. with a dimethyl sulfoxide solution as an EVOH sample.

EVOH preferably has at least one selected from the group consisting of the structural units (I) and (II). The lower limit of the content of the structural units (I) or (II) with respect to the entire structural units is preferably 0.5 mol %, more preferably 1 mol %, and still more preferably 1.5 mol %. On the other hand, the upper limit of the content of the structural units (I) or (II) is preferably 30 mol %, more preferably 15 mol %, and still more preferably 10 mol %. When the resin composition of the layer A has the structural unit represented by the above formula (I) and/or (II) at a proportion falling within the above range, flexibility and processing characteristics of the resin composition constituting the layer A are improved, and consequently, enables the stretchability and thermoformability of the inner liner to be improved.

In the structural units (I) and (II), the aliphatic hydrocarbon group having 1 to 10 carbon atoms is exemplified by an alkyl group, an alkenyl group and the like, the alicyclic hydrocarbon group having 3 to 10 carbon atoms is exemplified by a cycloalkyl group, a cycloalkenyl group and the like, and the aromatic hydrocarbon group having 6 to 10 carbon atoms is exemplified by a phenyl group, and the like.

In the structural unit (I), it is preferred that the $R^1$, $R^2$ and $R^3$ each independently represent a hydrogen atom, a methyl group, an ethyl group, a hydroxyl group, a hydroxymethyl group or a hydroxyethyl group. Among these, it is more preferred that they each independently represent a hydrogen atom, a methyl group, a hydroxyl group or a hydroxymethyl group. When the $R^1$, $R^2$ and $R^3$ each represent these options, stretchability and thermoformability of the inner liner can be further improved.

Although the method for allowing EVOH to include the structural unit (I) is not particularly limited, for example, a method in which a monomer derived into the structural unit (I) is copolymerized in polymerization of the ethylene and vinyl ester may be involved. The monomer derived into the structural unit (I) is exemplified by alkene such as propylene, butylene, pentene and hexene; alkene having a hydroxyl group and/or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene and 5,6-diacyloxy-1-hexene. Of these, in light of reactivity for copolymerization, and gas barrier properties of the resulting inner liner, propylene, 3-acyloxy-1-propene, 3-acyloxy-1-butene, 4-acyloxy-1-butene, and 3,4-diacetoxy-1-butene are preferred. Specifically, among these, propylene, 3-acetoxy-1-propene, 3-acetoxy-1-butene, 4-acetoxy-1-butene, and 3,4-diacetoxy-1-butene are preferred, and of these, 3,4-diacetoxy-1-butene is particularly preferred. In the case of the alkene having an ester, it is derived into the structural unit (I) during the saponification reaction.

In the above structural unit (II), it is preferred that $R^4$ and $R^5$ both represent a hydrogen atom. Particularly, it is more preferred that $R^4$ and $R^5$ both represent a hydrogen atom, one of the $R^6$ and $R^7$ represents an aliphatic hydrocarbon group having 1 to 10 carbon atoms, and the rest represents a hydrogen atom. The aliphatic hydrocarbon group is preferably an alkyl group or an alkenyl group. In light of particular note taken for the gas barrier properties of the inner liner, it is particularly preferred that one of the $R^6$ and $R^7$ represents a methyl group or an ethyl group, and the rest represents a hydrogen atom. Alternatively, it is also particularly preferred that one of the $R^6$ and $R^7$ represents a substituent represented by $(CH_2)_hOH$ (wherein, h is an integer of 1 to 8), and the rest represents a hydrogen atom. In the substituent represented by $(CH_2)_hOH$, h is preferably an integer of 1 to 4, more preferably 1 or 2, and particularly preferably 1.

Although the method for allowing EVOH to include the structural unit (II) is not particularly limited, for example, a method in which EVOH obtained by a saponification reaction is allowed to react with a monovalent epoxy compound to permit the EVOH to include the structural unit (II) may be employed. As the monovalent epoxy compound, a compound represented by any of the following formulae (III) to (IX) is suitably used.

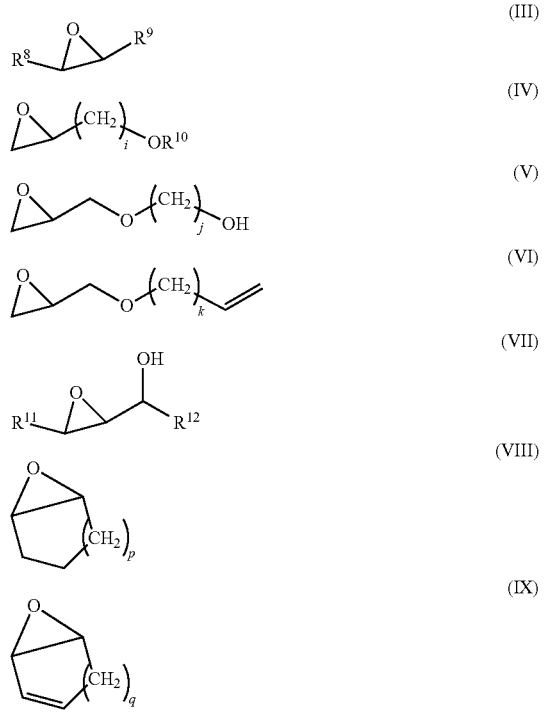

In the above formula (III) to (IX), $R^8$, $R^9$, $R^{10}$, $R^{11}$ and $R^{12}$ each independently represent a hydrogen atom, an aliphatic hydrocarbon group having 1 to 10 carbon atoms such as an alkyl group or an alkenyl group, an alicyclic hydrocarbon group having 3 to 10 carbon atoms such as a cycloalkyl group or a cycloalkenyl group, or an aliphatic hydrocarbon group having 6 to 10 carbon atoms such as a phenyl group; and i, j, k, p and q represent an integer of 1 to 8.

Examples of the monovalent epoxy compound represented by the above formula (III) include epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxidedecane, 2,3-epoxidedecane, 3,4-epoxidedecane, 4,5-epoxidedecane, 5,6-epoxidedecane, 6,7-epoxidedecane, epoxyethylbenzene, 1-phenyl-1,2-propane, 3-phenyl-1,2-epoxypropane, 1-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, and the like.

Examples of the monovalent epoxy compound represented by the above formula (IV) include methylglycidyl ether, ethylglycidyl ether, n-propylglycidyl ether, isopropyl glycidyl ether, n-butylglycidyl ether, isobutyl glycidyl ether, tert-butylglycidyl ether, 1,2-epoxy-3-pentyloxypropane, 1,2-epoxy-3-hexyloxypropane, 1,2-epoxy-3-heptyloxypropane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butoxyheptane, 1,2-epoxy-8-methoxyoctane, 1,2-epoxy-8-ethoxyoctane, 1,2-epoxy-8-butoxyoctane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, and the like.

Examples of the monovalent epoxy compound represented by the above formula (V) include ethylene glycol monoglycidyl ether, propanediol monoglycidyl ether, butanediol monoglycidyl ether, pentanediol monoglycidyl ether, hexanediol monoglycidyl ether, heptanediol monoglycidyl ether, octanediol monoglycidyl ether, and the like.

Examples of the monovalent epoxy compound represented by the above formula (VI) include 3-(2,3-epoxy)propoxy-1-propene, 4-(2,3-epoxy)propoxy-1-butene, 5-(2, 3-epoxy)propoxy-1-pentene, 6-(2,3-epoxy)propoxy-1-hexene, 7-(2,3-epoxy)propoxy-1-heptene, 8-(2,3-epoxy)propoxy-1-octene, and the like.

Examples of the monovalent epoxy compound represented by the above formula (VII) include 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, and the like.

Examples of the monovalent epoxy compound represented by the above formula (VIII) include 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, and the like.

Examples of the monovalent epoxy compound represented by the above formula (IX) include 3,4-epoxycyclopentane, 3,4-epoxycyclohexene, 3,4-epoxycycloheptene, 3,4-epoxycyclooctane, 3,4-epoxycyclononene, 1,2-epoxycyclodecene, 1,2-epoxycycloundecene, 1,2-epoxycyclododecane, and the like.

Among the aforementioned monovalent epoxy compounds, epoxy compounds having 2 to 8 carbon atoms are preferred. Particularly, in light of easy handling of the compound, and reactivity with EVOH, the monovalent epoxy compound has carbon atoms of more preferably 2 to 6, and still more preferably 2 to 4. Also, among the monovalent epoxy compounds represented by the above formula, compounds represented by the formula (III) or (IV) are particularly preferred. Specifically, in light of reactivity with EVOH and gas barrier properties of the resultant inner liner, 1,2-epoxybutane, 2,3-epoxybutane, epoxypropane, epoxyethane and glycidol are preferred, and of these, epoxypropane and glycidol are particularly preferred.

Next, a method for producing EVOH is explained in detail. A method for copolymerization of ethylene and a vinyl ester is not particularly limited, and for example any one of solution polymerization, suspension polymerization, emulsion polymerization, bulk polymerization may be employed. Further, either continuous, or batch-wise system may be adopted.

The vinyl ester which may be used for the polymerization is a fatty acid vinyl ester such as vinyl acetate, vinyl propionate, vinyl pivalate.

In the polymerization, further to the aforementioned components, a copolymerizable monomer, for example, other than those described in the foregoing, an alkene; unsaturated acid such as acrylic acid, methacrylic acid, crotonic acid, maleic acid or itaconic acid, or an anhydride, salt, or mono or dialkyl ester thereof; nitrile such as acrylonitrile or methacrylonitrile; amide such as acrylamide or methacryl amide; olefin sulfonic acid such as vinylsulfonic acid, allyl sulfonic acid or methallyl sulfonic acid, or a salt thereof; alkylvinyl ethers, vinylketone, N-vinylpyrrolidone, vinyl chloride, vinylidene chloride and the like may be copolymerized as a copolymerization component in a small amount. In addition, as a copolymerization component, a vinylsilane compound may be included in an amount of no less than 0.0002 mol % and no greater than 0.2 mol %. Examples of the vinylsilane compound include vinyltrimethoxysilane, vinyltriethoxysilane, vinyltri(β-methoxyethoxy)silane, γ-methacryloyloxypropylmethoxysilane, and the like. Of these, vinyltrimethoxysilane or vinyltriethoxysilane may be suitably used.

The solvent which may be used for the polymerization is not particularly limited as long as it is an organic solvent which can dissolve ethylene, vinyl ester and the ethylene-vinyl ester copolymer. As such a solvent, for example, alcohol such as methanol, ethanol, propanol, n-butanol or tert-butanol; dimethyl sulfoxide, or the like may be used. Of these, methanol is particularly preferred in terms of ease in separation and removal after the reaction.

As the catalyst for use in the polymerization, for example, an azonitrile based initiator such as 2,2-azobisisobutyronitrile, 2,2-azobis-(2,4-dimethylvaleronitrile), 2,2-azobis-(4-methoxy-2,4-dimethylvaleronitrile) or 2,2-azobis-(2-cyclopropyl propionitrile); an organic peroxide based initiator such as isobutyryl peroxide, cumyl peroxyneodecanoate, diisopropylperoxycarbonate, di-n-propylperoxydicarbonate, t-butylperoxyneodecanoate, lauroylperoxide, benzoylperoxide or t-butylhydroperoxide, or the like may be used.

The polymerization temperature is 20 to 90° C., and preferably 40 to 70° C. The polymerization time is 2 to 15 hrs, and preferably 3 to 11 hrs. The degree of polymerization is 10 to 90%, and preferably 30 to 80% with respect to the vinyl ester charged. The resin content in the solution after the polymerization is 5 to 85%, and preferably 20 to 70%.

After the polymerization for a predetermined period of time or after reaching to a predetermined degree of polymerization, a polymerization inhibitor is added as needed, and unreacted ethylene gas is eliminated by evaporation, followed by removal of unreacted vinyl ester. In an exemplary method which may be employed for removing unreacted vinyl ester, for example, the copolymer solution is continuously supplied at a constant speed from above a tower packed with Raschig rings, while steam of an organic solvent such as methanol is blown into the bottom of the tower, a mixed steam of the organic solvent such as methanol and the unreacted vinyl ester is distilled off from the top of the tower, whereas the copolymer solution from which the unreacted vinyl ester was eliminated is recovered from the bottom of the tower.

Next, an alkali catalyst is added to the copolymer solution, and the copolymer is saponified. The saponification method may be executed by either a continuous or batchwise system. Examples of the alkali catalyst include sodium hydroxide, potassium hydroxide, alkali metal alcoholate, and the like.

Conditions of saponification involve, for example in the case of a batchwise system, the copolymer solution concentration of 10 to 50%, the reaction temperature of 30 to 65° C., the catalyst amount used of 0.02 to 1.0 mol per mol of the vinyl ester structural unit, and the saponification time of 1 to 6 hrs.

Since EVOH after the saponification reaction contains the alkali catalyst, by-product salts such as sodium acetate and potassium acetate, and other impurities, these are preferably eliminated as needed by neutralization and washing. In this process, when EVOH after the saponification reaction is washed with water such as ion exchanged water, which is almost free from metal ions, chloride ions and the like, a part of sodium acetate, potassium acetate and the like may remain.

The resin composition constituting the layer A may contain one or a plurality of types of compounds selected from a phosphate compound, a carboxylic acid and a boron compound depending on the mode for carrying out the invention. When such a phosphate compound, a carboxylic acid or a boron compound is contained in the resin composition of the layer A, various types of performance of the inner liner can be improved.

Specifically, when a phosphate compound is contained in the resin composition of the layer A containing EVOH and the like, thermal stability of the inner liner during melt forming can be improved. The phosphate compound is not particularly limited, and is exemplified by various types of acids such as phosphoric acid and phosphorous acid, and salts thereof, and the like. Phosphate may be included in any form such as, for example, primary phosphate, secondary phosphate or tertiary phosphate, and its counter cation species is not particularly limited, which is preferably an alkali metal ion or an alkaline earth metal ion. Particularly, sodium dihydrogenphosphate, potassium dihydrogenphosphate, sodium hydrogenphosphate or potassium hydrogenphosphate is preferred in light of excellent effects of improving thermal stability.

The lower limit of the content of the phosphate compound (the content of the phosphate compound in terms of the phosphoric acid group equivalent in the dry resin composition of the layer A) is preferably 1 ppm, more preferably 10 ppm, and still more preferably 30 ppm. On the other hand, the upper limit of the content of the phosphate compound is preferably 10,000 ppm, more preferably 1,000 ppm, and still more preferably 300 ppm. When the content of the phosphate compound is less than the lower limit described above, coloring during melt forming tends to be significant. Since this tendency is remarkable when heat history is repeated in particular, a product obtained by forming a pellet of the resin composition may lack probability of recovery. To the contrary, when the content of the phosphate compound is beyond the upper limit described above, the product formed may easily generate gel and seeds.

In addition, the carboxylic acid included in the resin composition of the layer A containing EVOH and the like is effective in controlling the pH of the resin composition, and preventing gelation to improve the thermal stability. Carboxylic acid is preferably acetic acid or lactic acid in light of costs and the like.

The lower limit of the content of the carboxylic acid (the content of the carboxylic acid in the dry resin composition of the layer A) is preferably 1 ppm, more preferably 10 ppm, and still more preferably 50 ppm. On the other hand, the upper limit of the content of the carboxylic acid is preferably 10,000 ppm, more preferably 1,000 ppm, and still more preferably 500 ppm. When the content of the carboxylic acid is less than the lower limit described above, coloring may occur during the melt forming. To the contrary, the content of the carboxylic acid is beyond the upper limit described above, the interlayer adhesiveness may be insufficient.

Furthermore, the boron compound included in the resin composition of the layer A containing EVOH or the like is effective in improving thermal stability. In detail, when the boron compound is added to the resin composition constituted with EVOH or the like, it is believed that a chelate compound is produced between EVOH or the like and the boron compound. Thus, use of such EVOH or the like enables more superior thermal stability to be achieved than common EVOH or the like, and mechanical properties to be improved. The boron compound is not particularly limited, and examples include boric acids, boric acid esters, boric acid salts, boron hydrides, and the like. Specifically, boric acids are exemplified by orthoboric acid ($H_3BO_3$), metaboric acid, tetraboric acid and the like; boric acid ester are exemplified by triethyl borate, trimethyl borate and the like; boric acid salts are exemplified by alkali metal salts, alkaline earth metal salts and borax of the various types of boric acids described above and the like. Of these, orthoboric acid is preferred.

The lower limit of the content of the boron compound (the content of the boron compound equivalent to boron in the dry resin composition of the layer A) is preferably 1 ppm, more preferably 10 ppm, and still more preferably 50 ppm. On the other hand, the upper limit of the content of the boron compound is preferably 2,000 ppm, more preferably 1,000 ppm, and still more preferably 500 ppm. When the content of the boron compound is less than the lower limit described above, the effect of improving thermal stability by adding the boron compound may not be achieved. To the contrary, when the content of the boron compound is beyond the upper limit described above, gelation is likely to occur, and forming defectiveness may be caused.

A process for including the phosphate compound, carboxylic acid or boron compound in the resin composition containing EVOH or the like is not particularly limited, and for example, a process in which the phosphate compound is added to the resin composition when a pellet or the like of resin composition containing EVOH or the like is prepared, followed by kneading may be suitably employed. A process for adding to the resin composition is not also particularly limited, and illustrative examples include a process of adding in a form of a dry powder, a process of adding in a paste form impregnated with a solvent, a process of adding in a form suspended in a liquid, a process of adding as a solution dissolved in a solvent, and the like. Of these, in light of allowing for homogenously dispersion, a process of adding as a solution dissolved in a solvent is preferred. The solvent used in these methods is not particularly limited, and water is suitably used in light of solubility of additives, advantages in terms of costs, ease in handling, safety operational environments, and the like. When thus added, a metal salt, a resin other than EVOH and other additives and the like described later may be concomitantly added.

Moreover, as a process for including the phosphate compound, carboxylic acid, boron compound, a process of immersing a pellet or strand obtained with an extruder or the like after the aforementioned saponification in a solution containing these substance dissolved is also preferred in light of enabling homogenously dispersion. Also in this process, water is suitably used as a solvent for similar reasons to those described above. By dissolving a metal salt described later to this solution, the metal salt and the phosphate compound and the like may be contained together with.

The resin composition of the layer A preferably contains a compound that has a conjugated double bond having a molecular weight of no greater than 1,000. Due to including such a compound, the hue of the resin composition of the layer A is improved; therefore, an inner liner having a favorable appearance can be produced. Examples of such a compound include conjugated diene compounds having a structure in which at least two carbon-carbon double bonds and one carbon-carbon single bond are alternately linked, triene compounds having a structure in which three carbon-carbon double bonds and two carbon-carbon single bonds are alternately linked, conjugated polyene compounds having a structure in which more carbon-carbon double bonds and carbon-carbon single bonds are alternately linked, conjugated triene compounds such as 2,4,6-octatriene, and the like. Furthermore, in the compound that has a conjugated double bond, a plurality of conjugated double bonds may be present independently in one molecule, and for example, a compound in which three conjugated trienes are included in the same molecule, such as wood oil, may be also involved.

Examples of the compound that has a conjugated double bond may have, for example, any of other various types of functional groups such as a carboxyl group and salts thereof, a hydroxyl group, an ester group, a carbonyl group, an ether group, an amino group, an imino group, an amide group, a cyano group, a diazo group, a nitro group, a sulfone group, a sulfoxide group, a sulfide group, a thiol group, a sulfonic acid group and salts thereof, a phosphoric acid group and salts thereof, a phenyl group, a halogen atom, a double bond, a triple bond, and the like. Such a functional group may be directly bound to a carbon atom in the conjugated double bond, or may be bound to a position away from the conjugated double bond. A multiple bond in the functional group may be present at a position capable of conjugating with the conjugated double bond, and for example, 1-phenylbutadiene having a phenyl group, and sorbic acid having a carboxyl group and the like are also included in the compound that has a conjugated double bond as referred to herein. Specific examples of the compound include 2,4-diphenyl-4-methyl-1-pentene, 1,3-diphenyl-1-butene, 2,3-dimethyl-1,3-butadiene, 4-methyl-1,3-pentadiene, 1-phenyl-1,3-butadiene, sorbic acid, myrcene, and the like.

The conjugated double bond in the compound that has a conjugated double bond includes not only a conjugated double bond between aliphatic moieties such as 2,3-dimethyl-1,3-butadiene or sorbic acid, but also a conjugated double bond between aliphatic and aromatic moieties such as 2,4-diphenyl-4-methyl-1-pentene or 1,3-diphenyl-1-butene. Note that in light of possibility to obtain an inner liner having more superior appearance, the compound that includes a conjugated double bond between aliphatic moieties is preferred, and a compound that includes a conjugated double bond having a polar group such as a carboxyl group or a salt thereof, or a hydroxyl group is also preferred. Moreover, a compound that includes a conjugated double bond between aliphatic moieties and having a polar group is particularly preferred.

The molecular weight of the compound that has a conjugated double bond is preferably no greater than 1,000. When the molecular weight is greater than 1,000, surface smoothness, extrusion stability and the like of the inner liner may be deteriorated. The lower limit of the content of the compound that has a conjugated double bond having a molecular weight of no greater than 1,000 is, in light of achievable effects, preferably 0.1 ppm, more preferably 1 ppm, still more preferably 3 ppm, and particularly preferably 5 ppm. On the other hand, the upper limit of the content of the compound is, in light of achievable effects, preferably 3,000 ppm, more preferably 2,000 ppm, still more preferably 1,500 ppm, and particularly preferably 1,000 ppm.

A preferable process of adding the compound that has a conjugated double bond may include, in the case of EVOH for example, polymerizing as described above, followed by adding the compound prior to the saponification described above, in light of the improvement of the surface smoothness and extrusion stability. Although the reason is not necessarily clarified, the compound that has a conjugated double bond is believed to serve in preventing EVOH from deterioration before the saponification and/or during the saponification reaction.

The resin composition of the layer A may contain in addition to the aforementioned additives, a resin other than the gas barrier resin, or various additives such as a heat stabilizer, an ultraviolet ray absorbing agent, an antioxidant, a colorant and a filler in the range not to impair the object of the present invention. When the resin composition of the layer A contains such additives other than the additives described above, the amount is preferably no greater than 50% by mass, more preferably no greater than 30% by mass, and particularly preferably no greater than 10% by mass with respect to the total amount of the resin composition.

It is preferred that the resin composition of the layer A has a melt viscosity ($\eta_{1A}$) as determined at a temperature of 210° C. and a shear rate of 10/sec being no less than $1 \times 10^2$ Pa·s and no greater than $1 \times 10^4$ Pa·s and a melt viscosity ($\eta_{2A}$) as determined at a temperature of 210° C. and a shear rate of 1,000/sec being no less than $1 \times 10^1$ Pa·s and no greater than $1 \times 10^3$ Pa·s, and a ratio ($\eta_{2A}/\eta_{1A}$) of the melt viscosity satisfies the following formula (1A):

$$-0.8 \leq (1/2)\log_{10}(\eta_{2A}/\eta_{1A}) \leq -0.1 \tag{1A}$$

It is to be noted that suitable ranges according to the melt viscosities ($\eta_{1A}$) and ($\eta_{2A}$) and the ratio ($\eta_{2A}/\eta_{1A}$) of the melt viscosity can be particularly suitably applied when the gas barrier resin contained in the resin composition of the layer A is EVOH, or when the resin composition of the layer A has a Vicat softening temperature of less than 180° C.

When the melt viscosity ($\eta_{1A}$) is less than $1 \times 10^2$ Pa·s, neck-in and shaking of the film may be significant in film formation by extrusion such as lamination with melt coextrusion or melt extrusion, thereby enhancing thickness variation and width reduction of the obtained inner liner and the layer A before the lamination, and thus it may be impossible to obtain an inner liner that is uniform and has a size intended. To the contrary, when the melt viscosity ($\eta_{1A}$) is beyond $1 \times 10^4$ Pa·s, film cleavage becomes likely to occur and high-speed film formability is remarkably deteriorated particularly in the case in which lamination with melt coextrusion or formation with melt extrusion is carried out under conditions with taking up at high speed exceeding 100 m/min, and die swelling becomes likely to occur, whereby obtaining a thin inner liner or layer A before the lamination may be difficult.

In addition, when the melt viscosity ($\eta_{2A}$) is less than $1 \times 10^1$ Pa·s, neck-in and shaking of the film in film formation by extrusion such as lamination with melt coextrusion or melt extrusion may be significant, thereby enhancing thickness variation and width reduction of the obtained inner liner and the layer A before the lamination. To the contrary, when the melt viscosity ($\eta_{2A}$) is beyond $1 \times 10^3$ Pa·s, a torque applied to the extruder becomes too high, and thus extrusion patch and weld line may be likely to be generated.

When a value (1/2) $\log_{10}$ ($\eta_{2A}/\eta_{1A}$) calculated from the ratio ($\eta_{2A}/\eta_{1A}$) of the melt viscosity is less than −0.8, film cleavage is likely to occur in film formation by extrusion such as lamination with melt coextrusion or melt extrusion, whereby high-speed film formability may be deteriorated. On the other hand, when the value (1/2) $\log_{10}$ ($\eta_{2A}/\eta_{1A}$) is beyond −0.1, neck-in and shaking of the film occur in film formation by extrusion such as lamination with melt coextrusion or melt extrusion, whereby thickness variation and width reduction may occur in the obtained inner liner and the layer A before the lamination. In these regards, the value of (1/2) $\log_{10}$ ($\eta_{2A}/\eta_{1A}$) is more preferably no less than −0.6, and still more preferably no greater than −0.2. It is to be noted that the value (½) $\log_{10}$ ($\eta_{2A}/\eta_{1A}$) in the above formula is determined in a natural double-logarithmic graph of the melt viscosity along the ordinate with respect to the shear rate along the abscissa, as a slope of a line drawn by connecting two points of the melt viscosity ($\eta_{1A}$) and the melt viscosity ($\eta_{2A}$). Also, values of the melt viscosity ($\eta_{1A}$) and melt viscosity ($\eta_{2A}$) as referred to herein are determined by a method described in the Examples below.

In addition, it is preferred that a melt viscosity ($\eta_{1A}'$) of the resin composition of the layer A as determined at a temperature higher than a Vicat softening temperature of the resin composition by 30° C. and at a shear rate of 10/sec be no less than $1\times10^2$ Pa·s and no greater than $1\times10^4$ Pa·s, and a melt viscosity ($\eta_{2A}'$) as determined at a temperature higher than a Vicat softening temperature of the resin composition by 30° C. and at a shear rate of 1,000/sec be no less than $1\times10^1$ Pa·s and no greater than $1\times10^3$ Pa·s, and that the ratio ($\eta_{2A}'/\eta_{1A}'$) of the melt viscosity satisfies the following formula (1A'):

$$-0.8 \leq (½)\log_{10}(\eta_{2A}'/\eta_{1A}') \leq -0.1 \quad (1A').$$

It is to be noted that the suitable range of the melt viscosities ($\eta_{1A}'$) and ($\eta_{2A}'$), and the ratio ($\eta_{2A}'/\eta_{1A}'$) of the melt viscosity can be particularly preferably applied to a case in which the gas barrier resin included in the resin composition of the layer A is a resin other than EVOH, and a Vicat softening temperature of the resin composition of the layer A is no less than 180° C.

When the melt viscosity ($\eta_{1A}'$) is less tan $1\times10^2$ Pa·s, neck-in and shaking of the film may be significant in film formation by extrusion such as lamination with melt coextrusion or melt extrusion, thereby enhancing thickness variation and width reduction of the obtained multilayered structure and the barrier layer before the lamination, and thus it may be impossible to obtain a multilayered structure that is uniform and has a size intended. To the contrary, when melt viscosity ($\eta_{1A}'$) is beyond $1\times10^4$ Pa·s, film cleavage becomes likely to occur and high-speed film formability is remarkably deteriorated particularly in the case in which lamination with melt coextrusion or formation with melt extrusion is carried out under conditions with taking up at high speed exceeding 100 m/min, and die swelling becomes likely to occur, whereby obtaining a thin multilayered structure or barrier layer before the lamination may be difficult.

In addition, when the melt viscosity ($\eta_{2A}'$) is less than $1\times10^1$ Pa·s, neck-in and shaking of the film in film formation by extrusion such as lamination with melt coextrusion or melt extrusion may be significant, thereby enhancing thickness variation and width reduction of the obtained multilayered structure and the layer A before the lamination. To the contrary, when the melt viscosity ($\eta_{2A}'$) is beyond $1\times10^3$ Pa·s, a torque applied to the extruder becomes too high, and thus extrusion patch and weld line may be likely to be generated.

When a value (½) $\log_{10}$ ($\eta_{2A}'/\eta_{1A}'$) calculated from the ratio ($\eta_{2A}'/\eta_{1A}'$) of the melt viscosity is less than −0.8, film cleavage is likely to occur in film formation by extrusion such as lamination with melt coextrusion or melt extrusion, whereby high-speed film formability may be deteriorated. On the other hand, when the value (½) $\log_{10}$ ($\eta_{2A}'/\eta_{1A}'$) is beyond −0.1, neck-in and shaking of the film occur in film formation by extrusion such as lamination with melt coextrusion or melt extrusion, whereby thickness variation and width reduction may occur in the obtained multilayered structure and the layer A before the lamination. In these regards, the value of (½) $\log_{10}$ ($\eta_{2A}'/\eta_{1A}'$) is more preferably no less than −0.6, and still more preferably no greater than −0.2. It is to be noted that the value (½) $\log_{10}$ ($\eta_{2A}'/\eta_{1A}'$) in the above formula is determined in a natural double-logarithmic graph of the melt viscosity along the ordinate with respect to the shear rate along the abscissa, as a slope of a line drawn by connecting two points of the melt viscosity ($\eta_{1A}'$) and the melt viscosity ($\eta_{2A}'$). Also, values of the melt viscosity ($\eta_{1A}'$) and melt viscosity ($\eta_{2A}'$) as referred to herein are determined by a method described in the Examples below.

The resin composition of the layer A preferably has, in connection with a relationship between the melt kneading time and the torque at at least one point of a temperature that is higher than its melting point by 10 to 80° C., a value of viscosity behavioral stability ($M_{100}/M_{20}$, wherein $M_{20}$ represents a torque determined 20 min after starting kneading, and $M_{100}$ represents a torque determined 100 min after starting kneading) falling within the range of 0.5 to 1.5. As the value of the viscosity behavioral stability is approximate to 1, superior thermal stability (long run property) is indicated, with less change in the viscosity.

<Layer B>

The layer B is constituted with a resin composition containing an elastomer. Since the layer B constituted with a resin composition containing an elastomer is laminated, the inner liner can have improved stretchability and thermoformability. In addition, since the inner liner can enhance the interlayer adhesiveness between the layer B and the layer A, high durability can be provided, and gas barrier properties and stretchability can be maintained even if used with deformation.

Elastomers are resins having elasticity at around normal temperatures, and more specifically, resins having the following feature: when a sample is stretched two-fold under a room temperature condition (20° C.) and maintained as is for 1 min, the sample contracts to a length of less than 1.5-fold of the initial length within 1 min. In addition, elastomers are generally, in terms of their structures, polymers having a hard segment and a soft segment in the polymer chain.

As the elastomer, at least one selected from the group consisting of a polystyrene based elastomer, a polyolefin based elastomer, a polydiene based elastomer, a polyvinyl chloride based elastomer, a chlorinated polyethylene based elastomer, a polyurethane based elastomer, a polyester based elastomer, a polyamide based elastomer and a fluorocarbon resin based elastomer may be exemplified. Of these, in light of ease of forming, at least one selected from the group consisting of a polystyrene based elastomer, a polyolefin based elastomer, a polydiene based elastomer, a polyurethane based elastomer, a polyester based elastomer and a polyamide based elastomer are preferably used, and a polyurethane based elastomer is more preferably used.

Alternatively, such an elastomer is not particularly limited, and may be selected ad libitum for use from among well-known thermoplastic elastomers, and nonthermoplastic elastomers; however, for use in melt forming, a thermoplastic elastomer is preferably used.

As the thermoplastic elastomer, at least one selected from the group consisting of a polystyrene based thermoplastic elastomer, a polyolefin based thermoplastic elastomer, a polydiene based thermoplastic elastomer, a polyvinyl chloride based thermoplastic elastomer, a chlorinated polyethylene based thermoplastic elastomer, a polyurethane based thermoplastic elastomer, a polyester based thermoplastic elastomer, a polyamide based thermoplastic elastomer and a fluorocarbon resin based thermoplastic elastomer may be exemplified. Of these, in light of ease of forming, at least one selected from the group consisting of a polystyrene based thermoplastic elastomer, a polyolefin based thermoplastic elastomer, a polydiene based thermoplastic elastomer, a polyurethane based thermoplastic elastomer, a polyester based thermoplastic elastomer and a polyamide based thermoplastic elastomer is preferably used, and a polyurethane based thermoplastic elastomer is more preferably used.

<Polystyrene Based Thermoplastic Elastomer>

A polystyrene based thermoplastic elastomer has an aromatic vinyl based polymer block (hard segment) and a rubber block (soft segment). Thus, the aromatic vinyl based polymer moiety serves as a bridging point through forming physical crosslinking, whereas the rubber block imparts rubber elasticity.

The polystyrene based thermoplastic elastomer is exemplified by, according to the arrangement pattern of the soft segment included therein, styrene-butadiene-styrene block copolymers (SBS); styrene-isoprene-styrene block copolymers (SIS); styrene-isobutylene-styrene block copolymers (SIBS); styrene-ethylene/butylene-styrene block copolymers (SEBS); styrene-ethylene/propylene-styrene block copolymers (SEPS); block copolymers of crystalline polyethylene obtained by hydrogenating a block copolymer of polybutadiene with a butadiene-styrene random copolymer, and an ethylene/butylene-styrene random copolymer; diblock copolymers obtained by hydrogenating a block copolymer of polybutadiene or an ethylene-butadiene random copolymer with polystyrene, such as e.g., crystalline polyethylene and polystyrene. It is to be noted that these polystyrene based thermoplastic elastomers may be modified product such as modified products with maleic anhydride, or the like.

Among these, in view of the balance of mechanical strength, heat resistance stability, weather resistance, chemical resistance, gas barrier properties, flexibility, processibility and the like, styrene-isobutylene-styrene block copolymers (SIBS), styrene-ethylene/butylene-styrene block copolymers (SEBS) and styrene-ethylene/propylene-styrene block copolymers (SEPS) are preferred.

<Polyolefin Based Thermoplastic Elastomer>

The polyolefin based thermoplastic elastomer is exemplified by thermoplastic elastomers produced using polyolefin such as polypropylene or polyethylene as a hard segment, and an ethylene-propylene-diene copolymerized rubber or the like as a soft segment. There are polyolefin based thermoplastic elastomers of blend type and implant type. In addition, maleic anhydride-modified ethylene-butene-1 copolymer, maleic anhydride-modified ethylene-propylene copolymer, halogenated butyl based rubber, modified polypropylene, modified polyethylene and the like may be also exemplified.

<Polydiene Based Thermoplastic Elastomer>

The polydiene based thermoplastic elastomer is exemplified by 1,2-polybutadiene based TPE and trans1,4-polyisoprene based TPE, hydrogenated conjugated diene based TPE, epoxidized natural rubber, modified products with maleic anhydride of these, and the like.

1,2-Polybutadiene based TPE is polybutadiene containing no less than 90% 1,2-bond in the molecule, and composed of crystalline syndiotactic 1,2-polybutadiene as a hard segment, and amorphous 1,2-polybutadiene as a soft segment.

On the other hand, trans 1,4-polyisoprene based TPE has no less than 98% trans 1,4-structure, and composed of a crystalline trans 1,4-segment as a hard segment, and a noncrystalline trans 1,4-segment as a soft segment.

<Polyvinyl Chloride (PVC) Based Thermoplastic Elastomer>

There are, in general, three types of polyvinyl chloride based thermoplastic elastomers (TPVC) as follows. It is to be noted that the TPVC which may be used includes modified products such as maleic anhydride-modified PVC.

(1) Blend Type TPVC of High-Molecular-Weight PVC/Plasticized PVC

In this type of TPVC, high-molecular-weight PVC is used as a hard segment to allow the microcrystalline parts have a crosslinking point, and PVC plasticized with a plasticizer is used as a soft segment.

(2) Blend Type TPVC of Partially Crosslinked PVC/Plasticized PVC

In this type of TPVC, PVC having a partially crosslinked or branched structure introduced thereto is used as a hard segment, and as a soft segment PVC plasticized with a plasticizer is used.

(3) Alloy Type TPVC of PVC/Elastomer

In this type of TPVC, PVC is used as a hard segment, and as a soft segment a rubber such as partially crosslinked NBR, polyurethane based TPE or polyester based TPE, or TPE is used.

<Chlorinated Polyethylene (CPE) Based Thermoplastic Elastomer>

The chlorinated polyethylene based thermoplastic elastomer is a soft resin obtained by allowing polyethylene in the form of an aqueous suspension liquid, or in a solvent such as carbon tetrachloride to react with chlorine gas. In CPE, a crystalline polyethylene moiety is used as a hard segment, and a chlorinated polyethylene moiety is used as a soft segment. In CPE, both moieties are present admixed to form a multi block or random structure.

CPE can have varying molecular characteristics such as the chlorine content, block feature and degree of residual crystallization depending on the type, degree of chlorination, conditions of production and the like of the material polyethylene, and consequently a variety of properties can be attained with a wide range of hardness of those including resins and rubbers. In addition, crosslinking of CPE enables to provide properties similar to those of vulcanized rubbers, and modified products may be also produced by modification with maleic anhydride.

<Polyester Based Thermoplastic Elastomer>

The polyester based thermoplastic elastomer (TPEE) is a multi block copolymer in which polyester is used as a hard segment, and a polyether or polyester having a low glass transition temperature (Tg) is used as a soft segment in the molecule. There are following types of TPEE depending on their molecular structures; however, (1) polyester-polyether type and (2) polyester-polyester type may be generally employed among these.

(1) Polyester-Polyether Type TPEE

In this type of TPEE, an aromatic crystalline polyester is used as a hard segment, and as a soft segment a polyether is used, in general.

(2) Polyester-Polyester Type TPEE

In this type of TPEE, an aromatic crystalline polyester is used as a hard segment, and as a soft segment an aliphatic polyester is used.

(3) Liquid Crystalline TPEE

In this type of TPEE, as a special hard segment, a rigid liquid crystal molecule is used, and as a soft segment an aliphatic polyester is used.

<Polyamide Based Thermoplastic Elastomer>

The polyamide based thermoplastic elastomer (TPA) is a multi block copolymer in which polyamide is used as a hard segment, and as a soft segment a polyether or polyester having low Tg is used. The component of polyamide is selected from, nylon 6, 66, 610, 11, 12, etc., and nylon 6 or nylon 12 may be generally employed.

As a substance for constituting the soft segment, a long chain polyol such as polyetherdiol or polyesterdiol may be used. Typical examples of the polyether include poly(oxytetramethylene)glycol (PTMG), poly(oxypropylene)glycol, and the like. Typical examples of the polyesterdiol include poly(ethyleneadipate)glycol, poly(butylene-1,4-adipate)glycol, and the like.

<Fluorine Contained Resin Based Thermoplastic Elastomer>

The fluorine contained resin based thermoplastic elastomer is an ABA type block copolymer composed of a fluorine contained resin as a hard segment, and as a soft segment a fluorine rubber. The fluorocarbon resin of the hard segment which may be used is a tetrafluoroethylene-ethylene copolymerized polymer or polyvinylidene fluoride (PVDF), whereas the fluorine rubber of the soft segment which may be used is a vinylidene fluoride-hexafluoropropylene-tetrafluoroethylene ternary copolymerized polymer, or the like. More specifically, those including a vinylidene fluoride based rubber, an ethylene tetrafluoride-propylene rubber, an ethylene tetrafluoride-perfluoromethylvinyl ether rubber, a phosphazene based fluorine rubber, a fluoro polyether, a fluoronitroso rubber or perfluorotriazine may be exemplified.

The fluorine contained resin based TPE forms a crosslinking point by the hard segment, similarly to other TPE, through microphase separation.

<Polyurethane Based Thermoplastic Elastomer>

Polyurethane based thermoplastic elastomer (TPU) is a linear multi block copolymer, etc., including (1) as a hard segment polyurethane obtained by a reaction of a short chain glycol (low molecular polyol) with isocyanate, and (2) as a soft segment polyurethane obtained by a reaction of a long chain glycol (high molecular polyol) with isocyanate. In this regard, polyurethane is a generic name of compounds having an urethane bond (—NHCOO—), obtained by a polyaddition reaction (urethanating reaction) of isocyanate (—NCO) with an alcohol (—OH).

In the inner liner of the present invention, lamination of the layer B constituted with a resin composition containing TPU as an elastomer is preferred since stretchability and thermoformability can be improved. In addition, this inner liner enables the interlayer adhesiveness between the layer B and the layer A described above to be strengthened, and is thus preferred since superior durability can be attained, and gas barrier properties and stretchability can be maintained even if used with deformation.

TPU is constituted with a high molecular polyol, an organic polyisocyanate, a chain extender and the like. This high molecular polyol is a substance having a plurality of hydroxyl groups, and may be obtained by polycondensation, addition polymerization (for example, ring-opening polymerization), polyaddition, or the like. Examples of the high molecular polyol include polyester polyol, polyether polyol, polycarbonate polyol, cocondensates thereof (for example, polyester-ether-polyol), and the like. These high molecular polyol may be used either alone of one type, or as a mixture of two types thereof. Of these, polyester polyol or polycarbonate polyol is preferred, and polyester polyol is particularly preferred.

The polyester polyol may be produced, for example, according to a conventional method, by allowing a dicarboxylic acid, an ester thereof or an ester formable derivative such as an anhydride thereof to be condensed with a low molecular polyol by way of a direct esterification reaction or a transesterification reaction, or by subjecting lactone to ring-opening polymerization.

The dicarboxylic acid that constitutes the dicarboxylic acid polyester polyol is not particularly limited, and generally employed dicarboxylic acid in producing a polyester may be used. Specific examples of the dicarboxylic acid include aliphatic dicarboxylic acids having 4 to 12 carbon atoms such as succinic acid, glutaric acid, adipic acid, pimelic acid, suberic acid, azelaic acid, sebacic acid, dodecanedioic acid, methylsuccinic acid, 2-methylglutaric acid, trimethyladipic acid, 2-methyloctanedioic acid, 3,8-dimethyldecanedioic acid and 3,7-dimethyldecanedioic acid; alicyclic dicarboxylic acids such as cyclohexanedicarboxylic acid; aromatic dicarboxylic acids such as terephthalic acid, isophthalic acid, orthophthalic acid and naphthalenedicarboxylic acid, and the like. These dicarboxylic acids may be used either alone of one type, or as a mixture of two types thereof. Of these, due to having a carbonyl group that can be more readily reacted with a hydroxyl group of EVOH and the like in the layer A, and further enhancing the interlayer adhesiveness of the multilayered structure, aliphatic dicarboxylic acids having 6 to 12 carbon atoms are preferred, and adipic acid, azelaic acid or sebacic acid is particularly preferred.

The low molecular polyol is not particularly limited, and generally employed polyester polyol may be used. Specific examples of the low molecular polyol include aliphatic diols having 2 to 15 carbon atoms such as ethylene glycol, diethylene glycol, triethylene glycol, propylene glycol, 1,3-propanediol, 2-methyl-1,3-propanediol, 1,3-butylene glycol, 1,4-butanediol, neopentyl glycol, 1,5-pentanediol, 3-methyl-1,5-pentanediol, 1,6-hexanediol, 1,8-octanediol, 2-methyl-1,8-octanediol, 2,7-dimethyl-1,8-octanediol, 1,9-nonanediol, 2-methyl-1,9-nonanediol, 1,10-decanediol and 2,2-diethyl-1,3-propanediol; alicyclic diols such as 1,4-cyclohexanediol, cyclohexanedimethanol, cyclooctanedimethanol and dimethylcyclooctanedimethanol; aromatic bivalent alcohols such as 1,4-bis(β-hydroxyethoxy)benzene, and the like. These low molecular polyols may be used either alone of one type, or as a mixture of two types thereof. Among these, aliphatic diols having 5 to 12 carbon atoms and having a methyl group on the side chain such as 3-methyl-1,5-pentanediol, 2-methyl-1,8-octanediol, 2,7-dimethyl-1,8-octanediol, 1,9-nonanediol and 2,8-dimethyl-1,9-nonanediol are preferred in terms of ease of occurrence of the reaction of the ester group in the polyester polyol with a hydroxyl group of EVOH and the like in the layer A, and the like, and possibility of providing more superior interlayer adhesiveness of the multilayered structure obtained. In addition, when two or more types of the low molecular polyols are used as a mixture, it is more preferred that such an aliphatic diol having 5 to 12 carbon atoms and having a methyl group on the side chain is used in a proportion of no less than 50 mol % with respect to the total amount of the low molecular polyol. Furthermore, together with the low molecular polyol, a small amount of low molecular polyol having three or more functionalities may be used in combination. Examples of the low molecular polyol having three or more functionalities include trimethylolpropane, trimethylolethane, glycerin, 1,2,6-hexanetriol, and the like.

Examples of the lactone include ε-caprolactone, β-methyl-δ-valerolactone, and the like.

Examples of the polyether polyol include polyethylene glycol, polypropylene glycol, polytetramethylene glycol, poly(methyltetramethylene) glycol, and the like. These polyether polyols may be used either alone of one type, or as a mixture of two types thereof. Among these, polytetramethylene glycol is preferred.

As the polycarbonate polyol, for example, a product obtained by condensation polymerization of aliphatic diol having 2 to 12 carbon atoms such as 1,4-butanediol, 1,5-pentanediol, 1,6-hexanediol, 1,8-octanediol or 1,10-decanediol, or a mixture of these with diphenyl carbonate or phosgene may be suitably used.

The lower limit of the number average molecular weight of the high molecular polyol is preferably 500, more preferably 600, and still more preferably 700. On the other hand, the upper limit of the number average molecular weight of the high molecular polyol is preferably 8,000, more preferably 5,000, and still more preferably 3,000. When the number average molecular weight of the high molecular polyol is less than the lower limit described above, miscibility with organic polyisocyanate is so high that the resulting TPU has inferior resilience, whereby dynamic characteristics such as stretchability and thermoformability of the multilayered structure obtained may be deteriorated. To the contrary, when the number average molecular weight of the high molecular polyol is beyond the upper limit described above, miscibility with organic polyisocyanate is so low that mixing in the polymerization procedure may be difficult, and as a result, stable production of TPU may fail resulting from generation of blocks of gelatinous matter, and the like. It is to be noted that the number average molecular weight of the high molecular polyol is determined in accordance with JIS-K-1577, which is a number average molecular weight calculated on the basis of the hydroxyl value.

The organic polyisocyanate is not particularly limited, and well-known organic diisocyanate generally employed in producing TPU may be used. Examples of the organic diisocyanate include aromatic diisocyanate such as 4,4'-diphenylmethanediisocyanate, tolylenediisocyanate, phenylenediisocyanate, xylylenediisocyanate, 1,5-naphthylene diisocyanate, 3,3'-dichloro-4,4'-diphenyl methanediisocyanate and toluylenediisocyanate; aliphatic or alicyclic diisocyanate such as hexamethylenediisocyanate, isophoronediisocyanate, 4,4'-dicyclohexylmethanediisocyanate and xylylenediisocyanate hydride, and the like. Among these, in light of possibility of improving the strength and flex resistance of the multilayered structure obtained, 4,4'-diphenylmethanediisocyanate is preferred. These organic diisocyanate may be used either one type alone, or in combination of two or more types thereof.

As the chain extender, any chain extender generally employed for producing TPU may be used, and a low molecular compound having two or more active hydrogen atoms that can react with an isocyanate group in the molecule and having a molecular weight of no greater than 300 is suitably used. Examples of the chain extender include diols such as ethylene glycol, propylene glycol, 1,4-butanediol, 1,6-hexanediol, 1,4-bis(β-hydroxyethoxy)benzene and 1,4-cyclohexanediol, and the like. Among these, in light of stretchability and thermoformability of the multilayered structure obtained being more favorable, aliphatic diol having 2 to 10 carbon atoms is preferred, and 1,4-butanediol is particularly preferred. These chain extenders may be used either alone of one type, or as a mixture of two types thereof.

In a method for producing TPU, the aforementioned high molecular polyol, organic polyisocyanate and chain extender are used for producing TPU utilizing a well-known urethanating reaction technique, and any of a prepolymer method and a one-shot method may be used for the production. Of these, melt polymerization carried out under a condition substantially free from a solvent is preferred, and continuous melt polymerization carried out using a multi-screw extruder is particularly preferred.

In TPU, it is preferred that a ratio (isocyanate/(high molecular polyol+chain extender)) of the mass of the organic polyisocyanate to the total mass of the high molecular polyol and the chain extender be no greater than 1.02. When the ratio is beyond 1.02, stability in long-term operation during forming may be deteriorated.

The nitrogen content of TPU may be determined by appropriately selecting the ratio of the high molecular polyol and the organic diisocyanate employed, the content practically falls within the range of 1 to 7% by mass.

In addition, for the resin composition of the layer B, an adequate catalyst or the like for accelerating the reaction of the organic polyisocyanate and the high molecular polyol may be used if necessary. Moreover, the resin composition of the layer B may contain a variety of additives such as a resin other than the elastomer, a heat stabilizer, an ultraviolet ray absorbing agent, an antioxidant, a colorant and a filler, in the range not to impair the object of the present invention. When the resin composition of the layer B contains an additive, the amount thereof is preferably no greater than 50% by mass, more preferably no greater than 30% by mass, and is preferably no greater than 10% by mass with respect to the total amount of the resin composition.

The hardness of elastomer such as TPU in the resin composition of the layer B is, in terms of Shore A hardness, preferably 50 to 95, more preferably 55 to 90, and still more preferably 60 to 85. Use of TPU having a hardness falling within the above range is preferred, since a laminated structure that is superior in mechanical strength and durability, and has excellent flexibility is obtained.

For the reasons similar to those described above in connection with the resin composition of the layer A, it is preferred that a melt viscosity ($\eta_{1B}$) of the resin composition in the layer B as determined at a temperature of 210° C. and a shear rate of 10/sec be no less than $1\times10^2$ Pa·s and no greater than $1\times10^4$ Pa·s, and a melt viscosity ($\eta_{2B}$) as determined at a temperature of 210° C. and a shear rate of 1,000/sec of the same be no less than $1\times10^1$ Pa·s and no greater than $1\times10^3$ Pa·s, and a ratio ($\eta_{2B}/\eta_{1B}$) of the melt viscosity satisfies the following formula (1B):

$$-0.8 \leq (1/2)\log_{10}(\eta_{2B}/\eta_{1B}) \leq -0.1 \quad (1B).$$

Also, for the reasons similar to those in connection with the layer A, the value (½) $\log_{10}$ ($\eta_{2B}/\eta_{1B}$) is more preferably no less than −0.6, and still more preferably no greater than −0.2.

<Metal Salt>

At least one of the resin compositions included in the layer A and the layer B that are adjacent with each other contains a metal salt. By thus including a metal salt in at least one of the layer A and the layer B that are adjacent with each other, very superior interlayer adhesiveness between the layer A and the layer B can be achieved. Owing to such very superior interlayer adhesiveness, the inner liner has superior durability. Although the reason for improvement of the interlayer adhesiveness of the metal salt is not necessarily clear, it is believed that the improvement would result from acceleration of a bond forming reaction that occurs between the gas barrier resin in the resin composition of the layer A, and the elastomer in the resin composition of the layer B owing to the presence of the metal salt, and the like. As such a bond forming reaction, for example, a hydroxyl group exchange reaction that occurs between a carbamate group of the elastomer such as TPU with a hydroxyl group, etc., of the gas barrier resin, an addition reaction of a hydroxyl group, etc., of the gas barrier resin to a remaining isocyanate group in TPU, and the like may be assumed. It should be noted that the metal salt may be included in both the resin composition of the layer A and the resin composition of the layer B, or either one of the resin composition of the layer A or the resin composition of the layer B.

Although the metal salt is not particularly limited, an alkali metal salt, an alkaline earth metal salt or a metal salt of a d-block metal listed in group 4 of periodic table is preferred since the interlayer adhesiveness can be further enhanced. Among these, an alkali metal salt or an alkaline earth metal salt is more preferred, and an alkali metal salt is particularly preferred.

The alkali metal salt is not particularly limited, and examples thereof include aliphatic carboxylic acid salts, aromatic carboxylic acid salts, phosphoric acid salts, metal complexes of lithium, sodium, potassium, etc., and the like. Specific examples of the alkali metal salt include sodium acetate, potassium acetate, sodium phosphate, lithium phosphate, sodium stearate, potassium stearate, a sodium salt of ethylenediamine tetra acetic acid, and the like. Among these, sodium acetate, potassium acetate and sodium phosphate are particularly preferred, in light of being easily available.

The alkaline earth metal salt is not particularly limited, and examples thereof include acetic acid salts or phosphoric acid salts of magnesium, calcium, barium, beryllium, or the like. Among these, acetic acid salts or phosphoric acid salts of magnesium or calcium are particularly preferred, in light of being easily available. To include such an alkaline earth metal salt is also advantageous in capability of reducing the amount of adhesion to a die of a forming machine of the resin yielded by heat deterioration during melt forming.

Although the metal salt of a d-block metal listed in group 4 of periodic table is not particularly limited, example thereof include carboxylic acid salts, phosphoric acid salts or acetylacetonato salts of titanium, vanadium, chromium, manganese, iron, cobalt, nickel, copper, zinc, etc., and the like.

The lower limit of the content of the metal salt (content in terms of metal element equivalent on the basis of the entire inner liner) is 1 ppm, more preferably 5 ppm, still more preferably 10 ppm, and particularly preferably 20 ppm. On the other hand, the upper limit of the content of the metal salt is 10,000 ppm, more preferably 5,000 ppm, still more preferably 1,000 ppm, and particularly preferably 500 ppm. When the content of the metal salt is less than the lower limit described above, the interlayer adhesiveness may be inferior, and thus the durability of the inner liner may be deteriorated. To the contrary, when the content of the metal salt is beyond the upper limit described above, coloring of the resin composition may be significant, whereby the appearance of the inner liner may be deteriorated.

The lower limit of the content of the metal salt with respect to each resin composition containing the metal salt is preferably 5 ppm by mass, more preferably 10 ppm by mass, still more preferably 20 ppm by mass, and particularly preferably 50 ppm by mass. On the other hand, the upper limit of the content of the metal salt is preferably 5,000 ppm by mass, more preferably 1,000 ppm by mass, still more preferably 500 ppm by mass, and particularly preferably 300 ppm by mass. When the content of the metal salt is less than the lower limit described above, adhesiveness to other adjacent layer may be inferior, and thus the durability of the inner liner may be deteriorated. To the contrary, when the content of the metal salt is beyond the upper limit described above, coloring of the resin composition may be significant, whereby the appearance of the multilayered structure may be deteriorated.

The metal salt may be included in the resin composition of the layer A or the layer B by any method, which is not particularly limit, and a method similar to one for including a phosphate compound or the like in the resin composition of the layer A as described above may be employed.

<Relationship Between Layer A and Layer B>

In the inner liner, the interlayer adhesive force between the layer A and the layer B that are adjacent with each other may be no less than 500 g/15 mm, preferably no less than 600 g/15 mm, more preferably no less than 700 g/15 mm, and particularly preferably no less than 800 g/15 mm. When the interlayer adhesive force between the layer A and the layer B falls within the range described above, very favorable interlayer adhesiveness can be provided, whereby superior characteristics of the inner liner such as gas barrier properties can be maintained even against deformation such as stretching or flexion, and thus very superior durability can be attained. In this regard, the interlayer adhesive force between the layer A and the layer B as referred to herein means a value (unit: g/15 mm) of T-peel strength between the layer A and the layer B as determined with a measurement sample having a width of 15 mm using an autograph in an atmosphere of 23° C. and 50% RH under a condition involving a tension rate of 250 mm/min.

With regard to the interlayer relationship of the inner liner, it is desired that a binding reaction is allowed to actively occur at the interface between the layer A and the layer B. By causing a bond forming reaction between the gas barrier resin in the resin composition of the layer A and the elastomer in the resin composition of the layer B due to the metal salt included as described above, more superior interlayer adhesiveness can be achieved. Exemplary bond forming reaction includes: a hydroxyl group exchange reaction that occurs between a carbamate group of the elastomer such as TPU with a hydroxyl group or the like of the gas barrier resin; an addition reaction of a hydroxyl group or the like of the gas barrier resin to a remaining isocyanate group in TPU; and the like. As a result, the gas barrier properties, durability and the like of the inner liner can be further improved.

With regard to the relationship of the viscosity of each resin composition that constitutes the layer A and the layer B, when the gas barrier resin included in the resin composition of the layer A is EVOH, or particularly, when the Vicat softening temperature of the resin composition of the layer A is less than 180° C., the lower limit of the ratio ($\eta_{2B}/\eta_{2A}$) of the melt viscosity ($\eta_{2B}$) of the resin composition of the layer B to the melt viscosity ($\eta_{2A}$) of the resin composition of the layer A as determined at a temperature of 210° C. and a shear rate of 1,000/sec is preferably 0.3, more preferably 0.4, and still more preferably 0.5. On the other hand, the upper limit of the ratio ($\eta_{2B}/\eta_{2A}$) is preferably 2, more preferably 1.5, and still more preferably 1.3. When the ratio ($\eta_{2B}/\eta_{2A}$) of the viscosity falls within the range described above, the appearance of the inner liner becomes favorable in forming by a multilayer coextrusion process, and the adhesion between the layer A and the layer B becomes favorable, whereby the durability of the inner liner can be improved.

When the gas barrier resin included in the resin composition of the layer A is a resin other than the EVOH resin, and particularly when the Vicat softening temperature of the resin composition of the layer A is no less than 180° C., the lower limit of the ratio ($\eta_{2B}'/\eta_{2A}'$) of the melt viscosity ($\eta_{2B}'$) of the resin composition of the layer B to the melt viscosity ($\eta_{2A}'$) of the resin composition of the layer A as determined at a temperature higher than the Vicat softening temperature of the resin composition of the layer A by 30° C. and at a shear rate of 1,000/sec is preferably 0.3, more preferably 0.4, and still more preferably 0.5. On the other hand, the upper limit of the ratio ($\eta_{2B}'/\eta_{2A}'$) of the layer B to the layer A is preferably 2, more preferably 1.5, and still more preferably 1.3. When the viscosity ratio ($\eta_{2B}'/\eta_{2A}'$) falls within the range described above, the appearance of the multilayered structure becomes favorable in forming by a multilayer coextrusion process, and the adhesion between the layer A and the layer B becomes favorable, whereby the durability of the multilayered structure can be improved.

<Method for Producing the Inner Liner>

A method for producing the inner liner is not particularly limited as long as the method can favorably laminate and adhere the layer A and the layer B, and any of well-known methods such as e.g., coextrusion, pasting, coating, bonding, and attaching may be employed. The method for producing the inner liner is specifically exemplified by (1) a method for producing the inner liner having a layer A and a layer B by a multilayer coextrusion process using a resin composition for the layer A containing a gas barrier resin such as EVOH, and a resin composition for the layer B containing an elastomer, (2) a method for producing the inner liner having a layer A and a layer B, the method including: producing first a laminate including a layer that will be the layer A and a layer that will be the layer B by a coextrusion process using a resin composition for the layer A containing a gas barrier resin such as EVOH and a resin composition for the layer B containing an elastomer; overlaying a plurality of laminates via an adhesive; and stretching, and the like. Among these, in light of superior productivity, and excellent interlayer adhesiveness, (1) the method of formation by a multilayer coextrusion process using a resin composition containing a gas barrier resin such as EVOH and a resin composition containing an elastomer is preferred.

In the multilayer coextrusion process, the inner liner is formed by: heat melting the resin composition of the layer A and the resin composition of the layer B; supplying the melted resin compositions into an extrusion die from each distinctive extruder and pump through each channel; extruding from the extrusion die to give a multilayer; and thereafter allowing for lamination and adhesion. As the extrusion die, for example, a multimanifold die, a field block, a static mixer, or the like may be used.

<Inner Liner>

The inner liner is also superior in interlayer adhesiveness as described above, and has superior gas barrier properties, stretchability and thermoformability. Furthermore, the inner liner is capable of maintaining characteristics such as gas barrier properties even when used with deformation such as stretching or flexion imposed due to excellent durability such as being less likely to be accompanied by crack formation. Therefore, the inner liner is suitably used as an inner liner for pneumatic tires of various types of vehicles and the like.

Hereinafter, a pneumatic tire 1 having the inner liner of the present invention shown in FIG. 1 is explained. The pneumatic tire 1 includes: a pair of bead portions 2; a pair of side wall portions 3; a tread portion 4 continuously extending from the respective side wall portions 3; a carcass 5 extending in a toroidal shape across the pair of bead portions 2 to reinforce the bead portions 2, the side wall portions 3 and the tread portions 4; and a belt 6 composed of two belt layers disposed on the outer side in the radial direction of a crown portion of the carcass 5, and the inner liner of the present invention 7 is provided on the inner face of the carcass 5.

In the pneumatic tire 1, the carcass 5 includes a main body extending in a toroidal shape across the pair of bead cores 8 respectively embedded in the bead portions 1, and a turn-up portion wound around each bead core 8 from the inner side toward the outer side in the widthwise direction of the tire and turned up toward the outer side in the radial direction. In the pneumatic tire according to the invention, the number and the structure of plies of the carcass 5 are not limited to those shown in the FIGURE.

Although the belt 6 is composed of two belt layers in the pneumatic tire 1, the number of the belt layers constituting the belt 6 is not limited thereto. Each belt layer typically includes a rubber-coated layer of cords extending inclined with respect to the equatorial plane of the tire, and the two belt layers are laminated such that the cords constituting the respective belt layers cross with each other over the equatorial plane of the tire to form the belt 6. Further, the pneumatic tire 1 includes a belt reinforcing layer 9 disposed on the outer side of the belt 6 in the radial direction of the tire to cover the entirety belt 6; however, it is acceptable not to dispose the belt reinforcing layer 9, or to replace the belt reinforcing layer 9 with another belt reinforcing layer having a different structure. In the present embodiment, the belt reinforcing layer 9 is usually composed of a rubber-coated layer of cords arranged substantially in parallel with the circumferential direction of the tire.

The inner liner 7 in the pneumatic tire 1 is a multilayered structure having no less than 8 resin-layers as described above, and thus has superior characteristics such as gas barrier properties and durability. Therefore, the pneumatic tire 1 having the inner liner of the present invention 7 is excellent in internal pressure retainability, and also is accompanied by crack formation in the inner liner 7.

In the pneumatic tire 1, ambient air or air of which oxygen partial pressure has been changed, or an inert gas such as nitrogen may be used as a gas to be filled in the tire.

The structure of the pneumatic tire is not particularly limited and may be modified in various modes as long as the tire includes the inner liner of the present invention constituted as described above. The pneumatic tire can be suitably applied to tires for passenger vehicles, large tires, off-the-road tires, tires for motorcycles, tires for airplanes, tires for agricultural vehicles, and the like.

Other Embodiments

The inner liner of the present invention is not limited to the foregoing embodiments. For example, other layer may be included in addition to the layer A and the layer B. The type of the resin composition that may constitute the other layer is not particularly limited, but preferably has strong adhesiveness with the layer A and/or the layer B. As the other layer, one having a hydroxyl group or the like included in the gas barrier resin in the layer A, or having a molecular chain including a functional group that generates a bond via a reaction with a carbamate group, an isocyanate group or the like in the molecular chain of TPU in the layer B is particularly preferred.

In addition, the inner liner of the present invention may have a supporting layer laminated on either one or both faces of the aforementioned laminate having no less than 8 resin-layers. The supporting layer is not particularly limit, which may not be a resin layer, and for example, a general synthetic resin layer, a synthetic resin film or the like may be used. Also, laminating means of the supporting layer is not particularly limited, and adhesion by an adhesive, extrusion lamination, or the like may be employed.

EXAMPLES

Hereinafter, the present invention is explained in more specifically by way of Examples, but the present invention is not limited to the following Examples.

Production Example 1: Production of Pellet (A-1)

Into a polymerization tank equipped with a cooling device and a stirrer were charged 20,000 parts by mass of vinyl acetate, 2,000 parts by mass of methanol, 10 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 45 Kg/cm$^2$, and the temperature and the pressure were kept for 4 hrs while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 45% with respect to vinyl acetate charged. The copolymerization reaction liquid was supplied to the purge column, and after unreacted vinyl acetate was eliminated from the top of the tower by introduction of methanol steam from the bottom of the tower, a 40% methanol solution of the copolymer was obtained. The copolymer had a content of ethylene units of 32.5 mol %, and a content of vinyl acetate units of 67.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hrs. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-1) having a saponification degree of 99.5% (density: 1.19 g/cm$^3$).

EVOH (A-1) thus obtained was subjected to a treatment with an aqueous solution containing acetic acid, sodium acetate, sodium hydrogenphosphate and orthoboric acid (OBA) (an aqueous solution containing 0.3 g of acetic acid, 0.2 g of sodium acetate, 0.05 g of sodium hydrogenphosphate and 0.35 g of orthoboric acid dissolved in 1 L), at a bath ratio of 20, followed by drying and pelletization with an extruder to give a pellet (A-1). The MFR of the pellet (A-1) was 1.8 g/10 min (190° C., under a load of 2160 g). In addition, the pellet (A-1) had a content of acetate of 150 ppm, a content of sodium ion of 140 ppm, a content of the phosphate compound in terms of phosphoric acid group equivalent of 45 ppm, and a content of the boron compound in terms of a boron equivalent value of 260 ppm.

Production Example 2: Production of Pellet (A-2)

Into a polymerization tank equipped with a cooling device and a stirrer were charged 20,000 parts by mass of vinyl acetate, 4,000 parts by mass of methanol, 10 parts by mass of acetyl peroxide as a polymerization initiator (500 ppm with respect to the amount of vinyl acetate charged), 0.4 parts by mass of citric acid (20 ppm with respect to the amount of vinyl acetate charged), and 560 parts by mass of 3,4-diacetoxy-1-butene, and replacement with nitrogen was carried out while stirring. Thereafter, ethylene was introduced thereto, followed by adjusting the internal temperature to 67° C. and the ethylene pressure to 35 Kg/cm$^2$. Subsequently, polymerization was allowed while gradually adding 3,4-diacetoxy-1-butene in a total amount of 180 parts by mass for 6 hrs until the degree of polymerization reached 50% with respect to vinyl acetate charged. Thereafter, sorbic acid (SA) in an amount of 10 parts by mass (500 ppm with respect to the amount of vinyl acetate charged) was dissolved in methanol to prepare a 1.5% by mass solution, which was added to the polymerization tank. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 29.0 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hrs. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-2) having a saponification degree of 99.5% (density: 1.19 g/cm$^3$).

It should be noted that as the structural unit (I) of the EVOH (A-2) other than the ethylene unit and the vinyl alcohol unit, a structural unit having the following structure was introduced, and the amount introduced was 2.5 mol % from the determination by $^1$H-NMR (internal standard substance: tetramethylsilane; solvent: d6-DMSO).

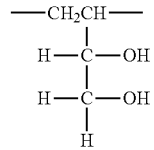

EVOH (A-2) thus obtained was subjected to a treatment with an aqueous solution containing acetic acid, sodium acetate, sodium hydrogenphosphate and orthoboric acid (OBA) (an aqueous solution containing 0.3 g of acetic acid, 0.2 g of sodium acetate, 0.07 g of sodium hydrogenphosphate and 0.32 g of orthoboric acid dissolved in 1 L), at a bath ratio of 20, followed by drying and pelletization with an extruder to give a pellet (A-2). The MFR of the pellet (A-2) was 1.2 g/10 min (190° C., under a load of 2160 g). In addition, the pellet (A-2) had a content of acetate of 150 ppm, a content of sodium of 150 ppm, a content of the phosphate compound in terms of phosphoric acid group equivalent of 50 ppm, and a content of the boron compound in terms of a boron equivalent value of 150 ppm.

Production Example 3: Production of Pellet (A-3)

Into a polymerization tank equipped with a cooling device and a stirrer were charged 20,000 parts by mass of vinyl acetate, 1,020 parts by mass of methanol, 3.5 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 59 Kg/cm², and the temperature and the pressure were kept for 4 hrs while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 30% with respect to vinyl acetate charged. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 44.5 mol %, and a content of vinyl acetate units of 55.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hrs. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH having a saponification degree of 99.5%.

EVOH thus obtained was subjected to a treatment with an aqueous solution containing acetic acid and sodium hydrogenphosphate (an aqueous solution containing 0.05 g of acetic acid, 0.02 g of sodium hydrogenphosphate and 0.03 g of orthoboric acid dissolved in 1 L) at a bath ratio of 20, followed by drying to give EVOH composition particles. The EVOH composition particles had MFR of 4.6 g/10 min (190° C., under a load of 2160 g). In addition, the EVOH composition particles had a content of acetate of 40 ppm, a content of the phosphate compound in terms of phosphoric acid group equivalent of 20 ppm.

Using the EVOH composition particles obtained as described above, epoxypropane was allowed to react with EVOH by means of a biaxial extruder "TEM-35BS" (37 mmφ, L/D=52.5) manufactured by Toshiba Machine Co., Ltd. under the extrusion conditions as in the following while adding a catalyst. Unreacted epoxypropane was eliminated from a vent, and then a 8.2% by mass aqueous ethylenediamine tetraacetate trisodium hydrate solution was added as a catalyst quencher to permit pelletization, followed by drying to give a pellet (A-3) that includes epoxypropane-modified ethylene-vinyl alcohol copolymer EVOH (A-3) having the following structure (density: 1.13 g/cm³) as a structural unit (II) other than the ethylene unit and the vinyl alcohol unit.

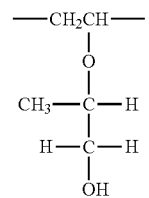

Cylinder, die temperature settings:
resin feed port/cylinder part inlet/adaptor/die =160/200/240/240 (° C.)
Screw rotation speed: 400 rpm
Ethylene-vinyl alcohol copolymer feed rate: 16 kg/hr
Epoxypropane feed rate: 2.4 kg/hr (pressure during feeding: 6 MPa)
Catalyst solution feed rate: 0.32 kg/hr
Preparation of catalyst: Zinc acetylacetonato monohydrate in an amount of 28 parts by mass in was mixed with 957 parts by mass of 1,2-dimethoxyethane to give a mixed solution. To thus resulting mixed solution were added 15 parts by mass of trifluoromethane sulfonic acid while stirring, whereby a catalyst solution was obtained. In other words, 1 mol of trifluoromethane sulfonic acid was added to 1 mol of zinc acetylacetonato monohydrate to prepare a mixed solution.

Aqueous catalyst quencher solution feed rate: 0.16 kg/hr
MFR of the resulting pellet (A-3) was 3.2 g/10 min (190° C., under a load of 2160 g). In addition, the pellet (A-3) had a content of acetate of 420 ppm, a content of zinc ion of 120 ppm, a content of sodium of 130 ppm, a content of the phosphate compound in terms of phosphoric acid group equivalent of 20 ppm, a content of trifluoromethane sulfonic acid ion of 280 ppm, and a content of the boron compound in terms of a boron equivalent value of 12 ppm. In addition, the amount of the structural unit (II) other than the ethylene unit and the vinyl alcohol unit of the EVOH (A-3) introduced (amount of modification of epoxybutane) was, as determined by ¹H-NMR (internal standard substance: tetramethylsilane; solvent: d6-DMSO) was 5.8 mol %.

Production Example 4: Production of Pellet (A-4)

A pellet (A-4) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 0.4 g of sodium acetate, 0.10 g of sodium hydrogenphosphate and 0.70 g of orthoboric acid dissolved in 1 L) at a bath ratio of 20 in Production Example 1. The MFR of the pellet (A-4) was 1.0 g/10 min (190° C., under a load of 2160 g). In addition, the pellet (A-4) had a content of acetate of 210 ppm, a content of sodium ion of 280 ppm, a content of the phosphate compound in terms of phosphoric acid group equivalent of 90 ppm, and a content of the boron compound in terms of a boron equivalent value of 520 ppm.

Production Example 5: Production of Pellet (A-5))

A pellet (A-5) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 0.02 g of sodium acetate, 0.005 g of sodium hydrogenphosphate and 0.35 g of orthoboric acid dissolved in 1 L) at a bath ratio of 20 in Production Example 1. The MFR of the pellet (A-5) was 1.6 g/10 min (190° C., under a load of 2160 g). In addition, the pellet (A-5) had a content of acetate of 95 ppm, a content of sodium ion of 14 ppm, a content of the phosphate compound in terms of phosphoric acid group equivalent of 5 ppm, and a content of the boron compound in terms of a boron equivalent value of 260 ppm.

Production Example 6: Production of Pellet (A-6)

A pellet (A-6) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 2.0 g of sodium acetate, 0.1 g of sodium hydrogenphosphate and 0.35 g of orthoboric acid dissolved in 1 L) at a bath ratio of 20 in Production Example 1. The MFR of the pellet (A-6) was 2.5 g/10 min (190° C., under a load of 2160 g). In addition, the pellet (A-6) had a content of acetate of 680 ppm, a content of sodium ion of 1,170 ppm, a content of the phosphate compound in terms of phosphoric acid group equivalent of 90 ppm, and a content of the boron compound in terms of a boron equivalent value of 250 ppm.

Production Example 7: Production of Pellet (A-7)

A pellet (A-7) was obtained in a similar manner to Production Example 1 except that the EVOH (A-1) having a content of ethylene units of 32.5 mol % and a saponification degree of 99.5% was subjected to a treatment using an aqueous solution containing acetic acid, magnesium acetate, sodium hydrogenphosphate and orthoboric acid (OBA) (aqueous solution containing 0.3 g of acetic acid, 0.2 g of magnesium acetate, 0.05 g of sodium hydrogenphosphate and 0.35 g of orthoboric acid dissolved in 1 L) at a bath ratio of 20 in Production Example 1. The MFR of the pellet (A-7) was 2.8 g/10 min (190° C., under a load of 2160 g). In addition, the pellet (A-7) had a content of acetate of 150 ppm, a content of sodium ion of 25 ppm, a content of magnesium ion of 110 ppm, a content of the phosphate compound in terms of phosphoric acid group equivalent of 45 ppm, and a content of the boron compound in terms of a boron equivalent value of 260 ppm.

Production Example 8: Production of Pellet (A-8)

A pellet (A-8) was obtained in a similar manner to Production Example 1 except that the EVOH (A-1) having a content of ethylene units of 32.5 mol % and a saponification degree of 99.5% was subjected to a treatment using an aqueous solution containing acetic acid, phosphoric acid and orthoboric acid (OBA) (aqueous solution containing 0.3 g of acetic acid, 0.06 g of phosphoric acid and 0.35 g of orthoboric acid dissolved in 1 L) at a bath ratio of 20 in Production Example 1. The MFR of the pellet (A-8) was 1.6 g/10 min (190° C., under a load of 2160 g). In addition, the pellet (A-8) had a content of acetate of 90 ppm, a content of the phosphate compound in terms of phosphoric acid group equivalent of 43 ppm, and a content of the boron compound in terms of a boron equivalent value of 260 ppm.

Production Example 9: Production of Pellet (A-9)

A pellet (A-9) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 40.0 g of sodium acetate, 0.1 g of sodium hydrogenphosphate and 0.35 g of orthoboric acid dissolved in 1 L) at a bath ratio of 20 in Production Example 1. The MFR of the pellet (A-9) was 6.8 g/10 min (190° C., under a load of 2160 g). In addition, the pellet (A-9) had a content of acetate of 13,500 ppm, a content of sodium ion of 23,000 ppm, a content of the phosphate compound in terms of phosphoric acid group equivalent of 90 ppm, and a content of the boron compound in terms of a boron equivalent value of 250 ppm.

Production Example 10: Production of Pellet (A-10)

A pellet (A-10) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 0.2 g of sodium acetate, 0.05 g of sodium hydrogenphosphate and 7.0 g of orthoboric acid dissolved in 1 L) at a bath ratio of 20 in Production Example 1. The MFR of the pellet (A-10) was 0.05 g/10 min (190° C., under a load of 2160 g). In addition, the pellet (A-10) had a content of acetate of 150 ppm, a content of sodium ion of 140 ppm, a content of the phosphate compound in terms of phosphoric acid group equivalent of 45 ppm, and a content of the boron compound in terms of a boron equivalent value of 5,000 ppm.

Production Example 11: Production of Pellet (A-11)

Into a reaction chamber equipped with a stirrer and a partial condenser were added 600 parts by mass of purified adipic acid, and heated under a nitrogen stream to melt the content. Thereafter, when heated to 180° C., 560 parts by mass of m-xylylenediamine having a purity of 99.93% by mass was added dropwise under normal pressure while further elevating the temperature. When the internal temperature reached 250° C., the dropwise addition of m-xylylenediamine was ceased, and the mixture was further stirred under normal pressure for additional 1 hour after the internal temperature reached 255° C. Thereafter, the reaction product was recovered, and then pulverized after air-cooled to obtain particulate poly m-xylyleneadipamide. The particulate matter thus obtained was charged into a rolling vacuum solid phase polymerization apparatus, and an operation including reducing the pressure to no greater than 200 Pa while rotating at 10 rpm, and raising up to normal pressure with no less than 99% by volume nitrogen was repeated three times. Thereafter, the internal temperature of the solid phase polymerization apparatus was elevated from the room temperature to 220° C. at a rate of temperature rise of 50° C./hour to carry out solid phase polymerization by heating the particulate matter. Specifically, in the solid phase polymerization, vacuum operation was started when the temperature of the particulate matter reached 135° C., and cooling was started 360 min after the temperature of the particulate matter reached 150° C. under normal pressure in nitrogen. Thereafter, when the temperature of the particulate matter became no greater than 80° C. under nitrogen stream, fine powder attached onto the surface of the particulate matter was eliminated to coordinate the size of the particulate matter to 6 to 10 mesh. After the resulting particulate matter was subjected to melt extrusion using a biaxial extruder at 260° C. to give a strand, pelletization was carried out to obtain a pellet (A-11) of nylon MXD6 (density: 1.22 g/cm$^3$). The resulting pellet (A-11) had a Vicat softening temperature of 225° C.

The pellet (A-11) had a melt viscosity $\eta_{1A}'$ of 1,100 Pa·s, and $\eta_{2A}'$ of 230 Pa·s, as determined at a temperature (255° C.) that is higher than the Vicat softening temperature by 30° C., and thus (½) $\log_{10}$ ($\eta_{2A}'/\eta_{1A}'$) was −0.340.

Production Example 12: Production of Pellet (A-12)

Glycolic acid (manufactured by Wako Pure Chemical Industries, Ltd.) was charged into an autoclave reaction vessel, and the temperature was elevated to 200° C. by heating over about 2 hrs while stirring to allow for condensation while generated water was distilled off. Subsequently, a low-boiling point fraction was distilled off by reducing the pressure to 20 kPa and keeping the same for 2 hrs to prepare a glycolic acid oligomer. The glycolic acid oligomer in an amount of 120 parts by mass was charged into a reaction chamber, and thereto were added 500 parts by mass of benzylbutyl phthalate (manufactured by Junsei Chemical Co., Ltd.) as a solvent, and 15 parts by mass of polypropylene glycol (manufactured by Junsei Chemical Co., Ltd., #400) as a solubilizing agent. In a nitrogen gas atmosphere, solution-phase depolymerization of the glycolic acid oligomer was permitted by heating the mixture to about 270° C. under a pressure of 5 kPa, and thus produced glycolide was codistilled with benzylbutyl phthalate. To the resulting codistillate was added cyclohexane in a volume of about 2 times, thereby allowing the glycolide to be precipitated from benzylbutyl phthalate, and the glycolide was filtered off. The filtered matter was recrystallized with ethyl acetate, and dried under reduced pressure to obtain purified glycolide. The synthetic glycolide in an amount of 100 parts by mass, 0.006 parts by mass of tin octanoate and 0.05 parts by mass of lauryl alcohol were charged into a reaction chamber, and polymerization was allowed at 220° C. for 3 hrs. Following the polymerization, the produced polymer was removed after cooling and pulverized to obtain a particulate polymer. The particulate matter was washed with acetone, vacuum dried at 30° C., and the size of the obtained particulate matter was adjusted. After the resulting particulate matter was subjected to melt extrusion using a biaxial extruder at 240° C. to give a strand, pelletization was carried out to obtain a pellet (A-12) of polyglycolic acid (PGA) (density: 1.60 g/cm$^3$). The resulting pellet (A-12) had a Vicat softening temperature of 204° C.

The pellet (A-12) had a melt viscosity $\eta_{1A}'$ of 850 Pa·s, and $\eta_{2A}'$ of 210 Pa·s, as determined at a temperature (234° C.) that is higher than the Vicat softening temperature by 30° C., and thus (½) $\log_{10}$ ($\eta_{2A}'/\eta_{1A}'$) was −0.304.

Production Example 13: Production of Pellet (A-13)

Into a reaction vessel equipped with a stirrer, a vacuum port and a feed port of nitrogen were charged 108 parts by mass of p-acetoxybenzoic acid, and 76.8 parts by mass of 0.70 dl/g polyethylene terephthalate having a limiting viscosity as determined using an equivalent mass mixed solvent of phenol/tetrachloroethane at 30° C. After the air in the reaction system was replaced with nitrogen three times, the mixture was stirred under a nitrogen stream at 280° C. for about 1 hour, whereby acetic acid in an amount of about 90% of theoretical amount of distillation was distilled off. Subsequently, the pressure of the system was gradually reduced to allow for a reaction at a final pressure of no greater than 1 mmHg. When the polymerization reaction was completed, the resulting reaction product was extruded from a nozzle in the form of a strand and cut to give a cylindrical pellet (A-13) of a wholly aromatic liquid crystal polyester (density: 1.45 g/cm$^3$). The resulting pellet (A-13) had a Vicat softening temperature of 193° C.

The pellet (A-13) had a melt viscosity of 790 Pa·s, and $\eta_{2A}'$ of 310 Pa·s, as determined at a temperature (223° C.) that is higher than the Vicat softening temperature by 30° C., and thus (½) $\log_{10}$ ($\eta_{2A}'/\eta_{1A}'$) was −0.203.

Production Example 14: Production of Pellet (B-1a)

A thermoplastic polyurethane resin (TPU) was produced by melt kneading a mixture of: 68.8% by mass of polyesterdiol having 2.0 hydroxyl groups per molecule and having a number average molecular weight of 1,000, obtained by allowing 1,4-butanediol to react with adipic acid; 27.5% by mass of 4,4-diphenyl methanediisocyanate; and 3.7% by mass of 1,4-butanediol by means of a multiscrew extruder (die temperature: 260° C.) for 20 min. This thermoplastic polyurethane resin was designated as TPU (B-1) (density: 1.16 g/cm$^3$; Shore A hardness: 85). The TPU (B-1) thus obtained was used as a pellet (B-1a).

Production Example 15: Production of Pellet (B-1b)

With 100 parts by mass of the TPU (B-1) obtained as described above, 0.37 parts by mass of sodium stearate were melt mixed by means of a biaxial extruder to produce a pellet (B-1b). The content of sodium ion in the pellet (B-1b) was 140 ppm.

Production Example 16: Production of Pellet (B-2a)

A thermoplastic polyurethane resin (TPU) was produced by melt kneading a mixture of: 61.6% by mass of the polyesterdiol described above; 32.3% by mass of 4,4-diphenyl methanediisocyanate; and 6.1% by mass of 1,4-butanediol by means of a multiscrew extruder (die temperature: 260° C.) for 20 min. This thermoplastic polyurethane resin was designated as TPU (B-2) (density: 1.17 g/cm$^3$; Shore A hardness: 90). The TPU (B-2) thus obtained was used as a pellet (B-2a).

Production Example 17: Production of Pellet (B-2b)

With 100 parts by mass of TPU (B-2) obtained as described above, 0.27 parts by mass of magnesium stearate were melt mixed by means of a biaxial extruder to produce a pellet (B-2b). The content of magnesium ion in the pellet (B-2b) was 110 ppm.

Production Example 18: Production of Pellet (B-3a)

A thermoplastic polyurethane resin (TPU) was produced by melt kneading a mixture of: 60.5% by mass of polytetramethylene glycol having 2.0 hydroxyl groups per molecule and a number average molecular weight of 1,000; 33.1% by mass of 4,4-diphenyl methanediisocyanate; and 6.4% by mass of 1,4-butanediol by means of a multiscrew extruder (die temperature: 260° C.) for 20 min. This thermoplastic polyurethane resin was designated as TPU (B-3) (density: 1.16 g/cm$^3$; Shore A hardness: 75). The TPU (B-3) thus obtained was used as a pellet (B-3a).

Production Example 19: Production of Pellet (B-3b)

With 100 parts by mass of TPU (B-3) obtained as described above, 0.27 parts by mass of magnesium stearate were melt mixed by means of a biaxial extruder to produce a pellet (B-3b). The content of magnesium ion in the pellet (B-3b) was 110 ppm.

Production Example 20: Production of Pellet (B-4a)

A thermoplastic polyurethane resin (TPU) was produced by melt kneading a mixture of: 80.6% by mass of polytetramethylene glycol having 2.0 hydroxyl groups per molecule and a number average molecular weight of 2,000; 17.0% by mass of 4,4-diphenyl methanediisocyanate; and 2.4% by mass of 1,4-butanediol by means of a multiscrew extruder (die temperature: 260° C.) for 20 min. This thermoplastic polyurethane resin was designated as TPU (B-4) (density: 1.16 g/cm$^3$; Shore A hardness: 65). The TPU (B-4) thus obtained was used as a pellet (B-4a).

Production Example 21: Production of Amide Based Elastomer Pellet (B-5))

With 100 parts by mass of an amide based elastomer pellet (manufactured by Daicel-Evonik Ltd., trade name "E40-S1"), 0.27 parts by mass of magnesium stearate were melt mixed at 240° C. by means of a biaxial extruder to produce a pellet (B-5). The content of magnesium ion in the pellet (B-5) was 110 ppm by mass.

Production Example 22: Production of Polyamide 12 Elastomer Pellet (B-6)

With 100 parts by mass of a polyamide 12 elastomer pellet (manufactured by Ube Industries, Ltd., trade name "UBESTA XPA9063X1"), 0.27 parts by mass of magnesium stearate were melt mixed at 240° C. by means of a biaxial extruder to produce a pellet (B-6). The content of magnesium ion in the pellet (B-6) was 110 ppm by mass.

Production Example 23: Production of Maleic Anhydride-Modified Ethylene-Butene-1 Copolymer Elastomer Pellet (B-7)

With 100 parts by mass of a maleic anhydride-modified ethylene-butene-1 copolymer elastomer pellet (manufactured by Mitsui Chemicals, Inc., trade name "TAFMER MH7010"), 0.37 parts by mass of sodium stearate were melt mixed at 210° C. by means of a biaxial extruder to produce a pellet (B-7). The content of sodium ion in the pellet (B-7) was 140 ppm by mass.

Production Example 24: Production of Maleic Anhydride-Modified Ethylene-Propylene Copolymer Elastomer Pellet (B-8)

With 100 parts by mass of a maleic anhydride-modified ethylene-propylene copolymer elastomer pellet (manufactured by Mitsui Chemicals, Inc., trade name "TAFMER MP0610"), 0.37 parts by mass of sodium stearate were melt mixed at 210° C. by means of a biaxial extruder to produce a pellet (B-8). The content of sodium ion in the pellet (B-8) was 140 ppm by mass.

Production Example 25: Production of Modified Polypropylene Based Elastomer Pellet (B-9)

With 100 parts by mass of a modified polypropylene based elastomer pellet (manufactured by Japan Polyolefins Co., Ltd., trade name "ADTEX ER320P"), 0.37 parts by mass of sodium stearate were melt mixed at 210° C. by means of a biaxial extruder to produce a pellet (B-9). The content of sodium ion in the pellet (B-9) was 140 ppm by mass.

Production Example 26: Production of Modified Polyethylene Based Elastomer Pellet (B-10)

With 100 parts by mass of a modified polyethylene based elastomer pellet (manufactured by Mitsui Chemicals, Inc., trade name "ADMER NB508"), 0.37 parts by mass of sodium stearate were melt mixed at 210° C. by means of a biaxial extruder to produce a pellet (B-10). The content of sodium ion in the pellet (B-10) was 140 ppm by mass.

Production Example 27: Production of-Modified Styrene Based Elastomer Pellet (B-11)

With 100 parts by mass of a modified styrene based elastomer pellet (manufactured by JSR Corporation, trade name "DYNARON 8630P"), 0.27 parts by mass of magnesium stearate were melt mixed at 240° C. by means of a biaxial extruder to produce a pellet (B-11). The content of magnesium ion in the pellet (B-11) was 110 ppm by mass.

Production Example 28: Production of-Modified Styrene Based Elastomer Pellet (B-12)

With 100 parts by mass of a modified styrene based elastomer pellet (manufactured by JSR Corporation, trade name "DYNARON 4630P") 100 parts by mass, 0.27 parts by mass of magnesium stearate were melt mixed at 240° C. by means of a biaxial extruder to produce a pellet (B-12). The content of magnesium ion in the pellet (B-12) was 110 ppm by mass.

Example 1

The pellet (A-1) and the pellet (B-1a) were supplied to a coextruder in molten states at 210° C. with a 17-layered feed block such that a multilayered structure (inner liner) was formed which included eight layers A and nine layers B alternately with the resin composition that constitutes each pellet, and coextruded to allow for interflowing, whereby a multilayer laminate (inner liner) was produced. The thickness of the channel of each layer was varied so as to gradually increase in the feed block from the front face side toward the middle side, whereby melts of the pellet (A-1) and the pellet (B-1a) that interflowed were extruded such that the each layer of the extruded multilayered structure has a uniform thickness. In addition, a slit shape was designed so as to give an approximately the same thickness of the layer A and the layer B that are adjacent with each other. The laminate consisting of 17 layers in total thus obtained was maintained to have the surface temperature of 25° C., and solidified by rapid cooling on a casting drum which had been electrostatically applied. The cast film obtained by solidification by rapid cooling was subjected to compression bonding on an exfoliate paper, and then rolled. It should be noted that the channel shape and total amount of discharge were predetermined such that a time period of about 4 min elapsed from the interflow of the melts of the pellet (A-1) and the pellet (B-1a) until the solidification by rapid cooling on the casting drum.

As a result of observation of a cross section of the cast film obtained as described above with DIGITAL MICROSCOPE VHX-900 (manufactured by KEYENCE CORPORATION), a multilayered structure (inner liner) having an average thickness of each layer A and layer B being 1 μm, and an average thickness of the entirety being 17 μm was revealed. It is to be noted that each thickness was an average of measurements at randomly selected nine points.

Examples 2 to 30, and Comparative Examples 1 to 11

Multilayered structures (inner liners) according to Examples 2 to 30, and Comparative Examples 1 to 11 were produced in a similar manner to Example 1 except that the pellet type, lamination state, coextrusion forming temperature, and the type and content of the metal salt as shown in Table 1 to Table 4 were employed. It should be noted that the melt viscosity shown in Table 3 shows a melt viscosity at a temperature in forming by coextrusion of each Example and Comparative Example (i.e., a temperature higher than the Vicat softening temperature of the resin composition of the layer A by 30° C.)

(Method for Evaluation of Characteristics of Multilayered Structure (Inner Liner))

Each of the characteristics of the multilayered structures obtained in Examples 1 to 30 and Comparative Examples 1 to 11 was evaluated according to the following method. The results of evaluation of these characteristics are shown in Table 1 to Table 4 together with the proportion of components, physical properties, and the like in the layer A and the layer B.

(1) Melt Viscosity of Resin Composition Constituting Each Layer

The melt viscosity of the resin composition constituting the layer A and the resin composition constituting the layer B at predetermined temperatures was measured on a melted sample pellet using Capilograph (manufactured by Toyo Seiki Seisaku-sho, Ltd., model IC).

(2) Appearance of Multilayered Structure

The presence/absence of flow patch, streak, and fish eye of the multilayered structures obtained were confirmed by visual inspection. The appearance of the multilayered structures was determined according to the following criteria:

A: flow patch, streak and fish eye being almost absent;
B: flow patch, streak and fish eye being present but a little;
C: flow patch, streak and fish eye being markedly present; and
D: flow patch and streak being remarkable, with a large number of fish eyes present.

(3) Oxygen Transmission Rate of Multilayered Structure

Moisture conditioning of the multilayered structure obtained was carried out at 20° C. and 65% RH for 5 days, and two pieces of a sample of the conditioned multilayered structure were provided to measure the oxygen transmission rate using MOCON, model OX-TRAN2/20 manufactured by Modern Controls, Inc., under a condition involving 20° C. and 65% RH in accordance with a method of JIS K7126 (isopiestic method), and the average was determined (unit: mL·20 μm/m²·day·atm).

(4) Oxygen Transmission Rate after Flexion of Multilayered Structure

In a similar manner to that described above, the oxygen transmission rate of the multilayered structure was determined in accordance with ASTM-F392-74 after repeating flexion 500 times using "Gelbo-Flex tester" manufactured by Rigaku Kogyo Co., Ltd.

(5) Flex Resistance of Multilayered Structure

In accordance with ASTM-F392-74, flexion was repeated using "Gelbo-Flex tester" manufactured by Rigaku Kogyo Co., Ltd., and the number of times of the flection repeated until a through-hole (pinhole) was first observed.

(6) Interlayer Adhesive Force Between Layer A and Layer B in the Multilayered Structure The interlayer adhesive force between the layer A and the layer B of the multilayered structure was determined as in the following. Moisture conditioning of the multilayered structure obtained was carried out in an atmosphere involving 23° C. and 50% RH for 7 days, followed by cutting to give a strip section having a width of 15 mm as a measurement sample. On this measurement sample, T-die peel strength was measured in an atmosphere involving 23° C. and 50% RH, using an autograph "model AGS-H" manufactured by Shimadzu Corporation at a tension rate of 250 mm/min. Thus obtained value (unit: g/15 mm) was determined as the interlayer adhesive force between the layer A and the layer B.

(7) Stretchability of Multilayered Structure

The multilayered structure thus obtained was mounted on a pantograph type biaxial stretching apparatus manufactured by Toyo Seiki Seisaku-sho, Ltd., and simultaneous biaxial stretching was carried out at 100° C. with a draw ratio of 4×4 times. The appearance of the stretched film was evaluated in accordance with the following evaluation criteria.

A: lack in uniformity and locally uneven wall thickness not being found;
B: slight lack in uniformity or locally uneven wall thickness being found, but being not practically problematic;
C: certain size of lack in uniformity or locally uneven wall thickness being found; and
D: development of breakage of the multilayered structure being found.

(8) Thermoformability of Multilayered Structure

The multilayered structure thus obtained was subjected to thermoforming using a thermoforming machine (a vacuum-pressure deep drawing molding machine model "FX-0431-3" manufactured by Asano Laboratories Co. Ltd.,) into a shape of a round cup (die shape: upper part: 75 mmφ; lower part: 60 mmφ; depth: 30 mm; and draw ratio S=0.4) at a film temperature of 120° C. with compressed air (atmospheric pressure: 5 kgf/cm²) to give a thermoformed vessel. The forming conditions employed in this process were as follows.

temperature of heater: 400° C.;
plug: 45φ×65 mm;
plug temperature: 100° C.; and
die temperature: 70° C.

The appearance of the thermoformed vessel obtained as described above was evaluated according to the following evaluation criteria.

A: lack in uniformity, crack, and locally uneven wall thickness not being found;
B: slight lack in uniformity, crack or locally uneven wall thickness being found, but being not practically problematic;
C: certain size of lack in uniformity, crack or locally uneven wall thickness being found; and
D: development of breakage of the thermoformed vessel being found, leading to occurrence of deformation.

(9) Evaluation with Laboratory Drum

Using the multilayered structure thus obtained as an inner liner, a pneumatic tire for passenger cars having a structure as illustrated by the cross-sectional construction shown in FIG. 1 and having a size of 195/65 R 15 was produced according to a routine method. The pneumatic tire produced as described above was run over 10,000 km on a drum rotating at a revolution number corresponding to a speed of 80 km/h under an air pressure of 140 kPa while being pressed under a load of 6 kN. The appearance of the inner liner of the pneumatic tire after the running on the drum was visually observed to evaluate the presence/absence of cracks.

TABLE 1

| | | unit | Example 1 | Example 2 | Example 3 | Example 4 | Example 5 | Example 6 | Example 7 |
|---|---|---|---|---|---|---|---|---|---|
| Multilayered structure | Layer A | Resin of layer A | — | EVOH (A-1) | EVOH (A-2) | EVOH (A-3) | EVOH (A-1) | | | |
| | | Pellet type of layer A | — | A-1 | A-2 | A-3 | A-4 | A-5 | A-6 | A-7 |
| | | Content of ethylene units | mol % | 32.5 | 29 | 44.5 | 32.5 | 32.5 | 32.5 | 32.5 |
| | | Saponification degree | mol % | 99.5 | 99.5 | 99.5 | 99.5 | 99.5 | 99.5 | 99.5 |
| | | Content of phosphate compound | ppm | 45 | 50 | 20 | 90 | 5 | 90 | 45 |
| | | Content of acetate | ppm | 150 | 150 | 420 | 210 | 95 | 680 | 150 |
| | | Content of boron compound | ppm | 260 | 150 | 12 | 520 | 260 | 250 | 260 |
| | | Melt viscosity ($\eta_{1A}$) | Pa·s | 3,100 | 6,800 | 2,000 | 8,900 | 3,700 | 2,800 | 2,500 |
| | | Melt viscosity ($\eta_{2A}$) | Pa·s | 500 | 670 | 390 | 750 | 580 | 470 | 400 |
| | | (½) log10 ($\eta_{2A}/\eta_{1A}$) | — | −0.396 | −0.503 | −0.355 | −0.537 | −0.402 | −0.388 | −0.398 |
| | | MFR (190° C., 2160 g) | g/10 min | 1.8 | 1.2 | 3.2 | 1 | 1.6 | 2.5 | 2.8 |
| | | Number of lamination of layer A | — | 8 | 8 | 8 | 8 | 8 | 8 | 8 |
| | | Average thickness of layer A | μm | 1 | 1 | 1 | 1 | 1 | 1 | 1 |
| | | Metal species | — | Na | Na | Na/Zn | Na | Na | Na | Na/Mg |
| | | Metal element equivalent content (Note 1) | ppm | 140 | 150 | 130/120 | 280 | 14 | 1,170 | 25/110 |
| | Layer B | Resin of layer B | — | TPU (B-1) | | | | | | |
| | | Pellet type of layer B | — | B-1a | B-1a | B-1a | B-1a | B-1a | B-1a | B-1a |
| | | Melt viscosity ($\eta_{1B}$) | Pa·s | 1,400 | 1,400 | 1,400 | 1,400 | 1,400 | 1,400 | 1,400 |
| | | Melt viscosity ($\eta_{2B}$) | Pa·s | 230 | 230 | 230 | 230 | 230 | 230 | 230 |
| | | (½) log10 ($\eta_{2B}/\eta_{1B}$) | — | −0.392 | −0.392 | −0.392 | −0.392 | −0.392 | −0.392 | −0.392 |
| | | Number of lamination of layer B | — | 9 | 9 | 9 | 9 | 9 | 9 | 9 |
| | | Average thickness of layer B | μm | 1 | 1 | 1 | 1 | 1 | 1 | 1 |
| | | Metal species | — | — | — | — | — | — | — | — |
| | | Metal element equivalent content (Note 2) | ppm | — | — | — | — | — | — | — |
| | Entirety | Entire thickness of multilayered structure | μm | 17 | 17 | 17 | 17 | 17 | 17 | 17 |
| | | $\eta_{2B}/\eta_{2A}$ | — | 0.46 | 0.34 | 0.59 | 0.31 | 0.4 | 0.49 | 0.58 |
| | | Metal element equivalent content (Note 3) | ppm | 66 | 71 | 118 | 132 | 6.6 | 551 | 64 |
| Evaluation of characteristics | | Appearance | — | A | A | A | B | A | B | A |
| | | Oxygen transmission rate | (Note 4) | 0.9 | 1.3 | 29 | 1 | 0.9 | 1 | 0.9 |
| | | Oxygen transmission rate after flexion | (Note 4) | 1.1 | 1.4 | 29 | 1.2 | 1.5 | 1.1 | 1.1 |
| | | Flex resistance | time | 1,700 | 2,800 | 5,500 | 1,300 | 1,200 | 1,900 | 2,300 |
| | | Interlayer adhesive force between the layer A and the layer B | g/15 mm | 860 | 1,030 | 1,330 | 1,280 | 610 | 1,440 | 1,290 |
| | | Stretchability | — | A | A | A | B | A | B | A |
| | | Thermoformability | — | A | A | A | B | A | B | A |
| | | Evaluation with laboratory drum (Presence/absence of cracks) | — | absent | absent | absent | absent | absent | absent | absent |

| | | unit | Example 8 | Example 9 | Example 10 | Example 11 | Example 12 | Example 13 | Example 14 |
|---|---|---|---|---|---|---|---|---|---|
| Multilayered structure | Layer A | Resin of layer A | — | EVOH (A-1) | | | | | | |
| | | Pellet type of layer A | — | A-8 | A-1 | A-1 | A-1 | A-1 | A-1 | A-1 |
| | | Content of ethylene units | mol % | 32.5 | 32.5 | 32.5 | 32.5 | 32.5 | 32.5 | 32.5 |
| | | Saponification degree | mol % | 99.5 | 99.5 | 99.5 | 99.5 | 99.5 | 99.5 | 99.5 |
| | | Content of phosphate compound | ppm | 43 | 45 | 45 | 45 | 45 | 45 | 45 |

TABLE 1-continued

| | | unit | | | | | | | |
|---|---|---|---|---|---|---|---|---|---|
| | Content of acetate | ppm | 90 | 150 | 150 | 150 | 150 | 150 | 150 |
| | Content of boron compound | ppm | 260 | 260 | 260 | 260 | 260 | 260 | 260 |
| | Melt viscosity ($\eta_{1A}$) | Pa·s | 3,800 | 3,100 | 3,100 | 3,100 | 3,100 | 3,100 | 3,100 |
| | Melt viscosity ($\eta_{2A}$) | Pa·s | 590 | 500 | 500 | 500 | 500 | 500 | 500 |
| | (½) log10 ($\eta_{2A}/\eta_{1A}$) | — | −0.404 | −0.396 | −0.396 | −0.396 | −0.396 | −0.396 | −0.396 |
| | MFR (190° C., 2160 g) | g/10 min | 1.6 | 1.8 | 1.8 | 1.8 | 1.8 | 1.8 | 1.8 |
| | Number of lamination of layer A | — | 8 | 3 | 4 | 16 | 32 | 64 | 64 |
| | Average thickness of layer A | μm | 1 | 1 | 1 | 0.5 | 0.1 | 0.05 | 0.2 |
| | Metal species | — | — | Na | Na | Na | Na | Na | Na |
| | Metal element equivalent content (Note 1) | ppm | — | 140 | 140 | 140 | 140 | 140 | 140 |
| Layer B Resin of layer B | | — | | | | TPU (B-1) | | | |
| | Pellet type of layer B | — | B-1b | B-1a | B-1a | B-1a | B-1a | B-1a | B-1a |
| | Melt viscosity ($\eta_{1B}$) | Pa·s | 2,500 | 1,400 | 1,400 | 1,400 | 1,400 | 1,400 | 1,400 |
| | Melt viscosity ($\eta_{2B}$) | Pa·s | 350 | 230 | 230 | 230 | 230 | 230 | 230 |
| | (½) log10 ($\eta_{2B}/\eta_{1B}$) | — | −0.427 | −0.392 | −0.392 | −0.392 | −0.392 | −0.392 | −0.392 |
| | Number of lamination of layer B | — | 9 | 4 | 5 | 17 | 33 | 65 | 65 |
| | Average thickness of layer B | μm | 1 | 1 | 1 | 0.5 | 0.5 | 0.2 | 0.5 |
| | Metal species | — | Na | — | — | — | — | — | — |
| | Metal element equivalent content (Note 2) | ppm | 140 | — | — | — | — | — | — |
| Entirety Entire thickness of multilayered structure | | μm | 17 | 7 | 9 | 17 | 20 | 16 | 45 |
| | $\eta_{2B}/\eta_{2A}$ | — | 0.59 | 0.46 | 0.46 | 0.46 | 0.46 | 0.46 | 0.46 |
| | Metal element equivalent content (Note 3) | ppm | 74 | 61 | 62 | 68 | 23 | 28 | 40 |
| Evaluation of characteristics | Appearance | — | A | A | A | A | A | A | A |
| | Oxygen transmission rate | (Note 4) | 0.9 | 3.3 | 1.9 | 0.8 | 1.8 | 1.7 | 1.6 |
| | Oxygen transmission rate after flexion | (Note 4) | 1.5 | 17.4 | 4.5 | 0.8 | 1.8 | 1.7 | 1.6 |
| | Flex resistance | time | 1,100 | 700 | 900 | 2,500 | 3,000 | 4,600 | 4,300 |
| | Interlayer adhesive force between the layer A and the layer B | g/15 mm | 770 | 820 | 830 | 890 | 900 | 910 | 910 |
| | Stretchability | — | A | B | A | A | A | A | A |
| | Thermoformability | — | A | B | A | A | A | A | A |
| | Evaluation with laboratory drum (Presence/absence of cracks) | — | absent | absent | absent | absent | absent | absent | absent |

| | | unit | Example 15 | Example 16 | Example 17 | Example 18 | Example 19 |
|---|---|---|---|---|---|---|---|
| Multilayered structure Layer A Resin of layer A | | — | | | EVOH (A-1) | | |
| | Pellet type of layer A | — | A-3 | A-1 | A-8 | A-1 | A-1 |
| | Content of ethylene units | mol % | 44.5 | 32.5 | 32.5 | 32.5 | 32.5 |
| | Saponification degree | mol % | 99.5 | 99.5 | 99.5 | 99.5 | 99.5 |
| | Content of phosphate compound | ppm | 20 | 45 | 43 | 45 | 45 |
| | Content of acetate | ppm | 420 | 150 | 90 | 150 | 150 |
| | Content of boron compound | ppm | 12 | 260 | 260 | 260 | 260 |
| | Melt viscosity ($\eta_{1A}$) | Pa·s | 2,000 | 3,100 | 3,800 | 3,100 | 3,100 |
| | Melt viscosity ($\eta_{2A}$) | Pa·s | 390 | 500 | 590 | 500 | 500 |
| | (½) log10 ($\eta_{2A}/\eta_{1A}$) | — | −0.355 | −0.396 | −0.404 | −0.396 | −0.396 |
| | MFR (190° C., 2160 g) | g/10 min | 3.2 | 1.8 | 1.6 | 1.8 | 1.8 |
| | Number of lamination of layer A | — | 64 | 16 | 8 | 16 | 16 |
| | Average thickness of layer A | μm | 3 | 0.5 | 1 | 0.5 | 0.5 |
| | Metal species | — | Na/Zn | Na | — | Na | Na |
| | Metal element equivalent content (Note 1) | ppm | 130/120 | 140 | — | 140 | 140 |
| Layer B Resin of layer B | | — | TPU (B-1) | TPU (B-2) | TPU (B-3) | TPU (B-4) | |
| | Pellet type of layer B | — | B-1a | B-2a | B-2b | B-3b | B-4a |
| | Melt viscosity ($\eta_{1B}$) | Pa·s | 1,400 | 3,000 | 2,800 | 2,600 | 3,100 |
| | Melt viscosity ($\eta_{2B}$) | Pa·s | 230 | 500 | 420 | 400 | 510 |
| | (½) log10 ($\eta_{2B}/\eta_{1B}$) | — | −0.392 | −0.389 | −0.412 | −0.406 | −0.392 |
| | Number of lamination of layer B | — | 65 | 17 | 9 | 17 | 17 |
| | Average thickness of layer B | μm | 10 | 1 | 1 | 1 | 1 |
| | Metal species | — | — | — | Mg | Mg | — |
| | Metal element equivalent content (Note 2) | ppm | — | — | 110 | 110 | — |

TABLE 1-continued

|  |  |  | unit |  |  |  |  |  |
|---|---|---|---|---|---|---|---|---|
|  | Entirety | Entire thickness of multilayered structure | μm | 842 | 25 | 17 | 25 | 25 |
|  |  | $\eta_{2B}/\eta_{2A}$ | — | 0.59 | 1 | 0.71 | 0.8 | 1.02 |
|  |  | Metal element equivalent content (Note 3) | ppm | 58 | 45 | 58 | 120 | 45 |
|  | Evaluation of characteristics | Appearance | — | A | A | A | A | A |
|  |  | Oxygen transmission rate | (Note 4) | 1.3 | 0.8 | 0.9 | 0.8 | 0.8 |
|  |  | Oxygen transmission rate after flexion | (Note 4) | 4 | 0.8 | 1.1 | 0.8 | 0.8 |
|  |  | Flex resistance | time | 2,800 | 3,100 | 1,700 | 3,500 | 4,100 |
|  |  | Interlayer adhesive force between the layer A and the layer B | g/15 mm | 880 | 920 | 1,010 | 900 | 860 |
|  |  | Stretchability | — | A | A | A | A | A |
|  |  | Thermoformability | — | A | A | A | A | A |
|  |  | Evaluation with laboratory drum (Presence/absence of cracks) | — | absent | absent | absent | absent | absent |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 2

|  |  |  | unit | Comparative Example 1 | Comparative Example 2 | Comparative Example 3 | Comparative Example 4 | Comparative Example 5 |
|---|---|---|---|---|---|---|---|---|
| Multilayered structure | Layer A | Resin of layer A | — | | | EVOH (A-1) | | |
|  |  | Pellet type of layer A | — | A-1 | A-1 | A-8 | A-9 | A-10 |
|  |  | Content of ethylene units | mol % | 32.5 | 32.5 | 32.5 | 32.5 | 32.5 |
|  |  | Saponification degree | mol % | 99.5 | 99.5 | 99.5 | 99.5 | 99.5 |
|  |  | Content of phosphate compound | ppm | 45 | 45 | 43 | 90 | 45 |
|  |  | Content of acetate | ppm | 150 | 150 | 90 | 13500 | 150 |
|  |  | Content of boron compound | ppm | 260 | 260 | 260 | 250 | 5,000 |
|  |  | Melt viscosity ($\eta_{1A}$) | Pa · s | 3,100 | 3,100 | 3,800 | 970 | 49,500 |
|  |  | Melt viscosity ($\eta_{2A}$) | Pa · s | 500 | 500 | 590 | 90 | 1,200 |
|  |  | (½) log10 ($\eta_{2A}/\eta_{1A}$) | — | −0.396 | −0.396 | −0.404 | −0.516 | −0.808 |
|  |  | MFR (190° C., 2160 g) | g/10 min | 1.8 | 1.8 | 1.6 | 6.8 | 0.05 |
|  |  | Number of lamination of layer A | — | 1 | 2 | 8 | 8 | 8 |
|  |  | Average thickness of layer A | μm | 8 | 5 | 1 | 1 | 1 |
|  |  | Metal species | — | Na | Na | — | Na | Na |
|  |  | Metal element equivalent content (Note 1) | ppm | 140 | 140 | — | 23,000 | 140 |
|  | Layer B | Resin of layer B | — | | | TPU (B-1) | | |
|  |  | Pellet type of layer B | — | B-1a | B-1a | B-1a | B-1a | B-1a |
|  |  | Melt viscosity ($\eta_{1B}$) | Pa · s | 1,400 | 1,400 | 1,400 | 1,400 | 1,400 |
|  |  | Melt viscosity ($\eta_{2B}$) | Pa · s | 230 | 230 | 230 | 230 | 230 |
|  |  | (½) log10 ($\eta_{2B}/\eta_{1B}$) | — | −0.392 | −0.392 | −0.392 | −0.392 | −0.392 |
|  |  | Number of lamination of layer B | — | 2 | 3 | 9 | 9 | 9 |
|  |  | Average thickness of layer B | μm | 4.5 | 3 | 1 | 1 | 1 |
|  |  | Metal species | — | — | — | — | — | — |
|  |  | Metal element equivalent content (Note 2) | ppm | — | — | — | — | — |
|  | Entirety | Entire thickness of multilayered structure | μm | 17 | 19 | 17 | 17 | 17 |
|  |  | $\eta_{2B}/\eta_{2A}$ | — | 0.46 | 0.46 | 0.39 | 2.56 | 0.19 |
|  |  | Metal element equivalent content (Note 3) | ppm | 66 | 74 | 0 | 10,800 | 66 |
| Evaluation of characteristics | | Appearance | — | B | B | A | D | D |
|  |  | Oxygen transmission rate | (Note 4) | 1.2 | 1 | 0.9 | 110 | 170 |
|  |  | Oxygen transmission rate after flexion | (Note 4) | 420 | 280 | 210 | 560 | 630 |
|  |  | Flex resistance | time | 300 | 400 | 450 | 250 | 200 |
|  |  | Interlayer adhesive force between the layer A and the layer | g/15 mm | 760 | 790 | 190 | 260 | 400 |
|  |  | Stretchability | — | D | C | B | D | D |
|  |  | Thermoformability | — | D | C | B | D | D |
|  |  | Evaluation with laboratory drum (Presence/absence of cracks) | — | somewhat present | somewhat present | somewhat present | present | present |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 3

| | | | unit | Example 20 | Example 21 | Example 22 | Comparative Example 6 | Comparative Example 7 |
|---|---|---|---|---|---|---|---|---|
| Multilayered structure | Layer A | Resin of layer A | — | nylon MXD6 | PGA | wholly aromatic liquid crystal polyester | nylon MXD6 | PGA |
| | | Pellet type of layer A | — | A-11 | A-12 | A-13 | A-11 | A-12 |
| | | Melt viscosity ($\eta_{1A}'$) | Pa·s | 1,100 | 850 | 790 | 1,100 | 850 |
| | | Melt viscosity ($\eta_{2A}'$) | Pa·s | 230 | 210 | 310 | 230 | 210 |
| | | (½) log10 ($\eta_{2A}'/\eta_{1A}'$) | — | −0.34 | −0.304 | −0.203 | −0.34 | −0.304 |
| | | Number of lamination of layer A | — | 8 | 8 | 8 | 2 | 2 |
| | | Average thickness of layer A | μm | 1 | 1 | 1 | 5 | 5 |
| | | Metal species | — | — | Sn | — | — | Sn |
| | | Metal element equivalent content (Note 1) | ppm | — | 5 | — | — | 5 |
| | Layer B | Resin of layer B | — | | | TPU (B-1) | | |
| | | Pellet type of layer B | — | B-1b | B-1b | B-1b | B-1b | B-1b |
| | | Melt viscosity ($\eta_{1B}'$) | Pa·s | 1,850 | 1,150 | 2,150 | 1,850 | 1,150 |
| | | Melt viscosity ($\eta_{2B}'$) | Pa·s | 300 | 190 | 350 | 300 | 190 |
| | | (½) log10 ($\eta_{2B}'/\eta_{1B}'$) | — | −0.395 | −0.391 | −0.394 | −0.395 | −0.391 |
| | | Number of lamination of layer B | — | 9 | 9 | 9 | 3 | 3 |
| | | Average thickness of layer B | μm | 1 | 1 | 1 | 3 | 3 |
| | | Metal species | — | Na | Na | Na | Na | Na |
| | | Metal element equivalent content (Note 2) | ppm | 140 | 140 | 140 | 140 | 140 |
| | Entirety | Entire thickness of multilayered structure | μm | 17 | 17 | 17 | 19 | 19 |
| | | $\eta_{2B}'/\eta_{2A}'$ | — | 1.3 | 0.9 | 1.13 | 1.3 | 0.9 |
| | | Metal element equivalent content (Note 3) | ppm | 72 | 66 | 66 | 65 | 58 |
| Temperature of forming by coextrusion | | | °C. | 255 | 234 | 223 | 255 | 234 |
| Evaluation of characteristics | | Appearance | — | A | A | A | B | B |
| | | Oxygen transmission rate | (Note 4) | 8.4 | 1.9 | 0.8 | 9.5 | 2.4 |
| | | Oxygen transmission rate after flexion | (Note 4) | 11.4 | 2.8 | 1.3 | 903.6 | 601.8 |
| | | Flex resistance | time | 2,000 | 1,300 | 1,100 | 250 | 120 |
| | | Interlayer adhesive force between the layer A and the layer B | g/15 mm | 1,210 | 1,030 | 950 | 1,050 | 900 |
| | | Stretchability | — | A | A | A | D | D |
| | | Thermoformability | — | A | A | A | D | D |
| | | Evaluation with laboratory drum (Presence/absence of cracks) | — | absent | absent | absent | present | present |

| | | | unit | Comparative Example 8 | Comparative Example 9 | Comparative Example 10 | Comparative Example 11 |
|---|---|---|---|---|---|---|---|
| Multilayered structure | Layer A | Resin of layer A | — | wholly aromatic liquid crystal polyester | nylon MXD6 | PGA | wholly aromatic liquid crystal polyester |
| | | Pellet type of layer A | — | A-13 | A-11 | A-12 | A-13 |
| | | Melt viscosity ($\eta_{1A}'$) | Pa·s | 790 | 1,100 | 850 | 790 |
| | | Melt viscosity ($\eta_{2A}'$) | Pa·s | 310 | 230 | 210 | 310 |
| | | (½) log10 ($\eta_{2A}'/\eta_{1A}'$) | — | −0.203 | −0.34 | −0.304 | −0.203 |
| | | Number of lamination of layer A | — | 2 | 8 | 8 | 8 |
| | | Average thickness of layer A | μm | 5 | 1 | 1 | 1 |
| | | Metal species | — | — | — | Sn | — |
| | | Metal element equivalent content (Note 1) | ppm | — | — | 5 | — |
| | Layer B | Resin of layer B | — | | TPU (B-1) | | |
| | | Pellet type of layer B | — | B-1b | B-1a | B-1a | B-1a |
| | | Melt viscosity ($\eta_{1B}'$) | Pa·s | 2,150 | 1,000 | 650 | 1,200 |
| | | Melt viscosity ($\eta_{2B}'$) | Pa·s | 350 | 200 | 150 | 230 |
| | | (½) log10 ($\eta_{2B}'/\eta_{1B}'$) | — | −0.394 | −0.349 | −0.318 | −0.359 |
| | | Number of lamination of layer B | — | 3 | 9 | 9 | 9 |
| | | Average thickness of layer B | μm | 3 | 1 | 1 | 1 |
| | | Metal species | — | Na | — | — | — |
| | | Metal element equivalent content (Note 2) | ppm | 140 | — | — | — |
| | Entirety | Entire thickness of multilayered structure | μm | 19 | 17 | 17 | 17 |
| | | $\eta_{2B}'/\eta_{2A}'$ | — | 1.13 | 0.87 | 0.71 | 0.74 |
| | | Metal element equivalent content (Note 3) | ppm | 59 | 0 | 3 | 0 |

TABLE 3-continued

|  |  |  |  |  |  |  |
|---|---|---|---|---|---|---|
|  | Temperature of forming by coextrusion | ° C. | 223 | 255 | 234 | 223 |
| Evaluation of characteristics | Appearance | — | B | B | B | B |
|  | Oxygen transmission rate | (Note 4) | 1.3 | 9.8 | 2.3 | 1.2 |
|  | Oxygen transmission rate after flexion | (Note 4) | 399.6 | 176 | 78.2 | 71.6 |
|  | Flex resistance | time | 90 | 450 | 300 | 250 |
|  | Interlayer adhesive force between the layer A and the layer B | g/15 mm | 930 | 420 | 330 | 180 |
|  | Stretchability | — | D | C | D | D |
|  | Thermoformability | — | D | C | D | D |
|  | Evaluation with laboratory drum (Presence/absence of cracks) | — | present | somewhat present | somewhat present | present |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 4

|  |  |  | unit | Example 23 | Example 24 | Example 25 | Example 26 |
|---|---|---|---|---|---|---|---|
| Multilayered structure | Layer A | Resin of layer A | — | EVOH (A-1) | EVOH (A-1) | EVOH (A-1) | EVOH (A-1) |
|  |  | Pellet type of layer A | — | A-1 | A-1 | A-1 | A-1 |
|  |  | Content of ethylene units | mol % | 32.5 | 32.5 | 32.5 | 32.5 |
|  |  | Saponification degree | mol % | 99.5 | 99.5 | 99.5 | 99.5 |
|  |  | Content of phosphate compound | ppm | 45 | 45 | 45 | 45 |
|  |  | Content of acetate | ppm | 150 | 150 | 150 | 150 |
|  |  | Content of boron compound | ppm | 260 | 260 | 260 | 260 |
|  |  | Melt viscosity ($\eta_{1A}$) | Pa · s | 3,100 | 3,100 | 3,100 | 3,100 |
|  |  | Melt viscosity ($\eta_{2A}$) | Pa · s | 500 | 500 | 500 | 500 |
|  |  | (½) $\log_{10} (\eta_{2A}/\eta_{1A})$ | — | −0.396 | −0.396 | −0.396 | −0.396 |
|  |  | MFR (190° C., 2160 g) | g/10 min | 1.8 | 1.8 | 1.8 | 1.8 |
|  |  | Number of lamination of layer A | — | 16 | 16 | 16 | 16 |
|  |  | Average thickness of layer A | μm | 0.4 | 0.4 | 0.4 | 0.4 |
|  |  | Metal species | — | Na | Na | Na | Na |
|  |  | Metal element equivalent content (Note 1) | ppm | 140 | 140 | 140 | 140 |
|  | Layer B | Resin of layer B | — | B-5 | B-6 | B-7 | B-8 |
|  |  | Pellet type of layer B | — | B-5 | B-6 | B-7 | B-8 |
|  |  | Melt viscosity ($\eta_{1B}$) | Pa · s | 350 | 1,800 | 4,800 | 6,000 |
|  |  | Melt viscosity ($\eta_{2B}$) | Pa · s | 120 | 390 | 530 | 520 |
|  |  | (½) $\log_{10} (\eta_{2B}/\eta_{1B})$ | — | −0.232 | −0.332 | −0.478 | −0.531 |
|  |  | Number of lamination of layer B | — | 17 | 17 | 17 | 17 |
|  |  | Average thickness of layer B | μm | 0.4 | 0.4 | 0.4 | 0.4 |
|  |  | Metal species | — | Mg | Mg | Na | Na |
|  |  | Metal element equivalent content (Note 2) | ppm | 110 | 110 | 140 | 140 |
|  | Entirety | Entire thickness of multilayered structure | μm | 13.2 | 13.2 | 13.2 | 13.2 |
|  |  | $\eta_{2B}/\eta_{2A}$ | — | 0.24 | 0.78 | 1.06 | 1.04 |
|  |  | Metal element equivalent content (Note 3) | ppm | 125 | 126 | 140 | 140 |
| Evaluation of characteristics |  | Appearance | — | A | A | A | A |
|  |  | Oxygen transmission rate | (Note 4) | 1.9 | 1.9 | 2 | 1.9 |
|  |  | Oxygen transmission rate after flexion | (Note 4) | 14 | 17 | 12 | 10 |
|  |  | Flex resistance | time | 610 | 580 | 820 | 930 |
|  |  | Interlayer adhesive force between the layer A and the layer B | g/15 mm | 640 | 590 | 880 | 990 |
|  |  | Stretchability | — | A | A | A | A |
|  |  | Thermoformability | — | A | A | A | A |
|  |  | Evaluation with laboratory drum (Presence/absence of cracks) | — | absent | absent | absent | absent |

|  |  |  | unit | Example 27 | Example 28 | Example 29 | Example 30 |
|---|---|---|---|---|---|---|---|
| Multilayered structure | Layer A | Resin of layer A | — | EVOH (A-1) | EVOH (A-1) | EVOH (A-1) | EVOH (A-1) |
|  |  | Pellet type of layer A | — | A-1 | A-1 | A-1 | A-1 |
|  |  | Content of ethylene units | mol % | 32.5 | 32.5 | 32.5 | 32.5 |
|  |  | Saponification degree | mol % | 99.5 | 99.5 | 99.5 | 99.5 |
|  |  | Content of phosphate compound | ppm | 45 | 45 | 45 | 45 |
|  |  | Content of acetate | ppm | 150 | 150 | 150 | 150 |

TABLE 4-continued

|  |  |  |  |  |  |  |
|---|---|---|---|---|---|---|
|  | Content of boron compound | ppm | 260 | 260 | 260 | 260 |
|  | Melt viscosity ($\eta_{1A}$) | Pa·s | 3,100 | 3,100 | 3,100 | 3,100 |
|  | Melt viscosity ($\eta_{2A}$) | Pa·s | 500 | 500 | 500 | 500 |
|  | (½) $\log_{10}$ ($\eta_{2A}/\eta_{1A}$) | — | −0.396 | −0.396 | −0.396 | −0.396 |
|  | MFR (190° C., 2160 g) | g/10 min | 1.8 | 1.8 | 1.8 | 1.8 |
|  | Number of lamination of layer A | — | 16 | 16 | 16 | 16 |
|  | Average thickness of layer A | μm | 0.4 | 0.4 | 0.4 | 0.4 |
|  | Metal species | — | Na | Na | Na | Na |
|  | Metal element equivalent content (Note 1) | ppm | 140 | 140 | 140 | 140 |
| Layer B | Resin of layer B | — | B-9 | B-10 | B-11 | B-12 |
|  | Pellet type of layer B | — | B-9 | B-10 | B-11 | B-12 |
|  | Melt viscosity ($\eta_{1B}$) | Pa·s | 660 | 3,300 | 1,500 | 4,900 |
|  | Melt viscosity ($\eta_{2B}$) | Pa·s | 160 | 410 | 210 | 600 |
|  | (½) $\log_{10}$ ($\eta_{2B}/\eta_{1B}$) | — | −0.308 | −0.453 | −0.427 | −0.456 |
|  | Number of lamination of layer B | — | 17 | 17 | 17 | 17 |
|  | Average thickness of layer B | μm | 0.4 | 0.4 | 0.4 | 0.4 |
|  | Metal species | — | Na | Na | Mg | Mg |
|  | Metal element equivalent content (Note 2) | ppm | 140 | 140 | 110 | 110 |
| Entirety | Entire thickness of multilayered structure | μm | 13.2 | 13.2 | 13.2 | 13.2 |
|  | $\eta_{2B}/\eta_{2A}$ | — | 0.32 | 0.82 | 0.42 | 1.2 |
|  | Metal element equivalent content (Note 3) | ppm | 140 | 140 | 126 | 126 |
| Evaluation of characteristics | Appearance | — | A | A | A | A |
|  | Oxygen transmission rate | (Note 4) | 1.9 | 2.1 | 2.1 | 2.1 |
|  | Oxygen transmission rate after flexion | (Note 4) | 11 | 13 | 16 | 14 |
|  | Flex resistance | time | 890 | 770 | 660 | 630 |
|  | Interlayer adhesive force between the layer A and the layer B | g/15 mm | 910 | 840 | 780 | 740 |
|  | Stretchability | — | A | A | A | A |
|  | Thermoformability | — | A | A | A | A |
|  | Evaluation with laboratory drum (Presence/absence of cracks) | — | absent | absent | absent | absent |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm From the results shown in Table 1 to Table 4, it is concluded that superior interlayer adhesiveness can be achieved in a multilayered structure having the layer A constituted with a resin composition containing a gas barrier resin, and the layer B constituted with a resin composition containing an elastomer, and including at least 8 layers laminated, when no less than 1 ppm and no greater than 10,000 ppm of a metal salt is contained in at least one of the resin compositions included in the layer A and the layer B that are adjacent with each other. In addition, it is also concluded that high flex resistance is thereby attained, and furthermore, a low oxygen transmission rate can be maintained even after flexion. Moreover, superior stretchability and thermoformability would be also suggested. In addition, it was indicated that the multilayered structures of Examples 1 to 30 were superior in durability, and less likely to be accompanied by crack formation also when used as an inner liner for a tire.

On the other hand, according to Comparative Examples 1, 2 and 6 to 8 in which the multilayered structure included less than eight layers laminated exhibited oxygen transmission rate significantly increased after flexion, indicating inferior flex resistance. In addition, stretchability and thermoformability were also inferior. According to Comparative Examples 3, 9 and the like in which both the layer A and the layer B do not contain no less than 1 ppm of a metal salt in the resin composition, achievement of sufficient adhesive force failed, and interlayer delamination was developed in the flex resistance test, and increase in the oxygen transmission rate after flexion was remarkable, also indicating inferior flex resistance. According to Comparative Examples 4 in which the resin composition of the layer A contained a metal salt in an amount beyond 10,000 ppm, EVOH significantly decomposed, thereby leading to failure in attaining stable melt viscosity in forming, and thus it was difficult to obtain a film having a multilayered structure in a favorable state. Therefore, the oxygen transmission rate, oxygen transmission rate after flexion and flex resistance were all inferior, and the adhesiveness was also inferior in strength due to disruption of the EVOH layer material. As these films having a multilayered structure had inferior quality before stretching, stretchability and thermoformability were also inferior. According to Comparative Example 5 in which the melt viscosity $\eta_{1A}$ at 210° C. was greater than $1 \times 10^4$ Pa·s; (½) $\log_{10}$ ($\eta_{2A}/\eta_{1A}$) was less than −0.8; and $\eta_{2B}/\eta_{2A}$ was less than 0.3, compatibility of EVOH and the elastomer in terms of viscosity was wrong, whereby it was difficult to obtain a film having a multilayered structure in a favorable state. In addition, for the same reasons, low interlayer adhesiveness, and all inferior oxygen transmission rate, oxygen transmission rate after flexion, and flex resistance were exhibited. As the quality of the film having a multilayered structure before stretching was inferior, unsatisfactory stretchability and thermoformability were also attained. In addition, it was also revealed that the multilayered structures of Comparative Examples 1 to 11 are likely to be accompanied by crack formation when used as an inner liner for a pneumatic tire.

INDUSTRIAL APPLICABILITY

As in the foregoing, the inner liner for a pneumatic tire of the present invention is suitably used as an inner liner of various types of pneumatic tires as well as tires for passenger vehicles since superior characteristics such as gas barrier properties are maintained even against deformation such as stretching or flexion.

EXPLANATION OF THE REFERENCE SYMBOLS

1: pneumatic tire
2: bead portion
3: side wall portion
4: tread portion
5: carcass
6: belt
7: inner liner
8: bead core
9: belt reinforcing layer

The invention claimed is:

1. An inner liner, comprising at least 17 resin-layers, the at least 17 resin-layers comprising:
a layer A comprising a resin composition comprising a gas barrier resin, and
a layer B comprising a resin composition comprising an elastomer,
wherein, the layer A and the layer B are alternately laminated in direct contact, a total number of the layer A and the layer B being at least 17 and no greater than 129,
at least one selected from the group consisting of the resin composition in the layer A and the resin composition in the layer B comprises a metal salt,
a content of the metal salt is at least 1 ppm and no greater than 10,000 ppm in terms of metal element equivalent,
an interlayer adhesive force between the layer A and the layer B is at least 1,210 g/15 mm,
an average thickness of the layer A in terms of a single layer is at least 0.01 μm and no greater than 10 μm,
an average thickness of the layer B in terms of a single layer is at least 0.01 μm and no greater than 10 μm,
the gas barrier resin is at least one selected from the group consisting of an ethylene-vinyl alcohol copolymer, a polyamide resin, and a polyester resin,
the elastomer is at least one selected from the group consisting of a polyurethane based elastomer, a polyester based elastomer, a polyamide based elastomer, and a fluorine contained resin based elastomer,
the resin composition of the layer A further comprises a carboxylic acid in an amount of at least 1 ppm and no greater than 10,000 ppm, and
the inner liner is suitable for a pneumatic tire.

2. The inner liner of claim 1, wherein a thickness of the inner liner is at least 0.1 μm and no greater than 1,000 μm.

3. The inner liner of claim 1, wherein the metal salt is at least one selected from the group consisting of an alkali metal salt, an alkaline earth metal salt, and a salt of a d-block metal in group 4 of the periodic table.

4. The inner liner of claim 1, wherein the gas barrier resin is an ethylene-vinyl alcohol copolymer.

5. The inner liner of claim 4, wherein a content of ethylene units of the ethylene-vinyl alcohol copolymer is at least 3 mol % and no greater than 70 mol %.

6. The inner liner of claim 4, wherein the ethylene-vinyl alcohol copolymer has a saponification degree of at least 80 mol %.

7. The inner liner of claim 4, wherein the ethylene-vinyl alcohol copolymer comprises at least one selected from the group consisting of structural units (I) and (II):

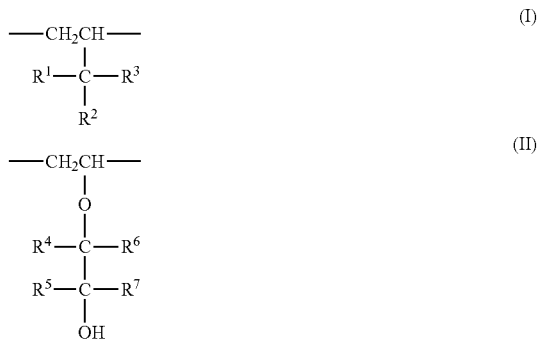

a content of the structural units (I) or (II) with respect to all structural units is at least 0.5 mol % and no greater than 30 mol %,
$R^1$, $R^2$, and $R^3$ are each independently a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxyl group; with the provisos that two among $R^1$, $R^2$, and $R^3$ are optionally bound with one another, unless the two among $R^1$, $R^2$, and $R^3$ are both a hydrogen atom; and that any of $R^1$, $R^2$, and $R^3$ that is an aliphatic hydrocarbon group having 1 to 10 carbon atoms, an alicyclic hydrocarbon group having 3 to 10 carbon atoms, or an aromatic hydrocarbon group having 6 to 10 carbon atoms optionally has a hydroxyl group, a carboxyl group, or a halogen atom; and
$R^4$, $R^5$, $R^6$ and $R^7$ are each independently a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxyl group; with the provisos that $R^4$ and $R^5$ or $R^6$ and $R^7$ are optionally bound with one another, unless both $R^4$ and $R^5$ or both $R^6$ and $R^7$ are a hydrogen atom; and that any of $R^4$, $R^5$, $R^6$, and $R^7$ that is an aliphatic hydrocarbon group having 1 to 10 carbon atoms, an alicyclic hydrocarbon group having 3 to 10 carbon atoms, or an aromatic hydrocarbon group having 6 to 10 carbon atoms optionally has a hydroxyl group, an alkoxy group, a carboxyl group, or a halogen atom.

8. The inner liner of claim 1, wherein the resin composition of the layer A further comprises a phosphate compound in an amount of at least 1 ppm and no greater than 10,000 ppm in terms of phosphoric acid group equivalent.

9. The inner liner of claim 1, wherein the resin composition of the layer A further comprises a boron compound in an amount of at least 1 ppm and no greater than 2,000 ppm in terms of boron equivalent.

10. The inner liner of claim 1, wherein the resin composition of the layer A, the resin composition of the layer B, or both has:
a melt viscosity ($\eta_1$), as determined at a temperature of 210° C. and a shear rate of 10/sec, of at least $1 \times 10^2$ Pa·s and no greater than $1 \times 10^4$ Pa·s, a melt viscosity ($\eta_2$), as determined at a temperature of 210° C. and a shear rate of 1,000/sec, of at least $1\times10^1$ Pa·s and no greater than $1\times10^3$ Pa·s, and a ratio ($\eta_2/\eta_1$) of the melt viscosities satisfies formula (1):

$$-0.8 \leq (\tfrac{1}{2})\log_{10}(\eta_2/\eta_1) \leq -0.1 \qquad (1).$$

11. The inner liner of claim 1,
wherein a ratio ($\eta_{2B}/\eta_{2A}$) of a melt viscosity ($\eta_{2B}$) of the resin composition of the layer B to a melt viscosity ($\eta_{2A}$) of the resin composition of the layer A as determined at a temperature of 210° C. and a shear rate of 1,000/sec is 0.3 or greater and 2 or less.

12. The inner liner of claim 1, wherein a binding reaction occurs at an interface between the layer A and the layer B.

13. A method for producing the inner liner of claim 1, the method comprising:
    extruding, in a multilayer coextrusion process, a resin composition comprising a gas barrier resin, and a resin composition comprising an elastomer, to obtain the inner liner.

* * * * *